(12) United States Patent
Lee et al.

(10) Patent No.: US 11,691,911 B2
(45) Date of Patent: Jul. 4, 2023

(54) REINFORCED WINDOW MEMBER AND METHOD OF MANUFACTURING THE SAME

(71) Applicant: SAMSUNG DISPLAY CO., LTD., Yongin-si (KR)

(72) Inventors: Hoikwan Lee, Suwon-si (KR); Cheolmin Park, Hwaseong-si (KR); Eun-Kyung Yeon, Suwon-si (KR); Jeongseok Lee, Osan-si (KR); Seungho Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 568 days.

(21) Appl. No.: 15/926,146

(22) Filed: Mar. 20, 2018

(65) Prior Publication Data

US 2018/0297892 A1 Oct. 18, 2018

(30) Foreign Application Priority Data

Apr. 13, 2017 (KR) .................. 10-2017-0048080
Oct. 19, 2017 (KR) .................. 10-2017-0136116

(51) Int. Cl.
| | |
|---|---|
| C03C 21/00 | (2006.01) |
| C03C 23/00 | (2006.01) |
| B32B 17/06 | (2006.01) |
| C03C 3/083 | (2006.01) |
| H04M 1/18 | (2006.01) |
| H04M 1/02 | (2006.01) |

(52) U.S. Cl.
CPC ............ *C03C 21/002* (2013.01); *B32B 17/06* (2013.01); *C03C 3/083* (2013.01); *C03C 23/007* (2013.01); *H04M 1/0249* (2013.01); *H04M 1/0266* (2013.01); *H04M 1/185* (2013.01)

(58) Field of Classification Search
None
See application file for complete search history.

(56) References Cited

U.S. PATENT DOCUMENTS

| | | | |
|---|---|---|---|
| 3,425,816 | A | 2/1969 | Garfinkel et al. |
| 8,919,150 | B2 | 12/2014 | Imai et al. |
| 9,487,434 | B2 | 11/2016 | Amin et al. |

(Continued)

FOREIGN PATENT DOCUMENTS

| | | |
|---|---|---|
| JP | 2014-133683 | 7/2014 |
| KR | 10-2011-0036828 | 4/2011 |

(Continued)

*Primary Examiner* — Lisa L Herring
(74) *Attorney, Agent, or Firm* — F. Chau & Associates, LLC

(57) ABSTRACT

A method of manufacturing a window member includes performing a first reinforcement operation including performing a first ion-exchange treatment on an initial window member. The first ion-exchange treatment includes applying ion salts at a temperature equal to or greater than a first temperature of about 500° C. A stress relief operation includes performing a heat treatment and/or a salt treatment on the initial window member to which the first reinforcement operation is performed. A second reinforcement operation includes performing a second ion-exchange treatment on the initial window member to which the stress relief operation is performed.

31 Claims, 22 Drawing Sheets

(56) References Cited

U.S. PATENT DOCUMENTS

| | | | |
|---|---|---|---|
| 9,840,435 B2 | 12/2017 | Ohara et al. | |
| 2010/0009154 A1* | 1/2010 | Allan | C03C 3/085 |
| | | | 428/220 |
| 2010/0009164 A1 | 1/2010 | Allan et al. | |
| 2013/0219966 A1* | 8/2013 | Hasegawa | C03C 21/002 |
| | | | 65/30.14 |
| 2013/0260154 A1* | 10/2013 | Allan | C03C 21/002 |
| | | | 428/410 |
| 2014/0087193 A1 | 3/2014 | Cites et al. | |
| 2014/0248495 A1 | 9/2014 | Matsuda et al. | |
| 2014/0370264 A1 | 12/2014 | Ohara et al. | |
| 2015/0079400 A1 | 3/2015 | Fu et al. | |
| 2015/0239775 A1 | 8/2015 | Amin et al. | |
| 2015/0329419 A1 | 11/2015 | Kreski | |
| 2016/0194243 A1 | 7/2016 | Lee et al. | |
| 2016/0264452 A1 | 9/2016 | Amin et al. | |
| 2017/0283303 A1* | 10/2017 | Fu | C03C 21/002 |
| 2018/0057402 A1* | 3/2018 | Hu | C03B 27/03 |
| 2018/0230044 A1* | 8/2018 | Ozeki | C03C 21/002 |
| 2018/0319706 A1* | 11/2018 | Murayama | C03C 21/00 |

FOREIGN PATENT DOCUMENTS

| | | |
|---|---|---|
| KR | 10-2014-0074924 | 6/2014 |
| KR | 10-2014-0103953 | 8/2014 |
| KR | 10-1493749 | 2/2015 |
| KR | 10-2017-0036067 | 3/2017 |
| WO | WO 2013088856 | 6/2013 |

\* cited by examiner

REINFORCED WINDOW MEMBER AND METHOD OF MANUFACTURING THE SAME

CROSS-REFERENCE TO RELATED APPLICATIONS

This U.S. non-provisional patent application claims priority under 35 U.S.C. § 119 to Korean Patent Application No. 10-2017-0048080, filed on Apr. 13, 2017 and Korean Patent Application No. 10-2017-0136116, filed on Oct. 19, 2017, the contents of which are hereby incorporated by reference in their entireties.

TECHNICAL FIELD

The present disclosure relates to a window member, and more particularly, to a reinforced window member and a method of manufacturing the reinforced window member.

DISCUSSION OF THE RELATED ART

Often, electronic devices with display screens include a window member through which the display screen may be seen. An accommodation member may house the electronic device, the display screen and the window member.

The window member protects the display screen and the electronic device and provides a user with an active region though which am image may be observed and a touch inputs may be received. Accordingly, the user provides an input to the electronic device or receives information generated by the electronic device through the window member. In addition, the electronic device is protected from external impacts by the window member.

SUMMARY

A method of manufacturing a window member includes performing a first reinforcement operation including performing a first ion-exchange treatment on an initial window member. The first ion-exchange treatment includes applying ion salts at a temperature equal to or greater than a first temperature of about 500° C. A stress relief operation includes performing a heat treatment and/or a salt treatment on the initial window member to which the first reinforcement operation is performed. A second reinforcement operation includes performing a second ion-exchange treatment on the initial window member to which the stress relief operation is performed.

A method of manufacturing a window member includes performing a first reinforcement operation including performing a first ion-exchange treatment on an initial window member, thereby giving the initial window member a first surface compressive stress and a first depth of compression. A stress relief operation includes performing a heat treatment or a salt treatment on the initial window member to which the first reinforcement operation is performed, thereby decreasing the first surface compressive stress to a second surface compressive stress and thereby changing the first depth of compression to a second depth of compression different from the first depth of compression. A second reinforcement operation includes performing a second ion-exchange treatment on the initial window member to which the stress relief operation is performed, thereby increasing the second surface compressive stress to a third surface compressive stress.

A window member includes a base including a first surface and a second surface facing the first surface in a first direction. The base has a thickness defined in the first direction. First ion salts are distributed in the base and each of the first ion salts has a first ion radius. Second ion salts are distributed in the base and each of the second ion salts has a second ion radius greater than the first ion radius. A variation in compressive stress according to a depth increasing along the first direction from the first surface of the base forms a first plot, and the first plot includes a point at which an absolute value of a slope is smaller than about 2 MPa/μm in a depth range in which the compressive stress is greater than about 0 MPa/μm.

A window member includes a first surface and a second surface facing the first surface. The window member has a thickness defined in a first direction between the first surface and the second surface. The window member has a compressive stress smaller than about 150 MPa on the first surface, and has a compressive stress graph varied depending on a depth increasing along the first direction from the first surface. The compressive stress graph includes a first plot at a depth equal to or smaller than a transition point and a second plot at a depth greater than the transition point. The first plot has an average slope equal to or greater than about −200 MPa/μm and equal to or smaller than about −40 MPa/μm. The second plot has an average slope different from the first plot. The transition point is greater than about 15 m.

A method of manufacturing a window member includes performing a first reinforcement operation including an ion-exchange treatment operation that exposes an initial window member to a first reinforcement environment at a first temperature equal to or greater than about 500° C. The first reinforcement environment includes a first ion salt. A second reinforcement operation includes providing the first-reinforced initial window member to a second reinforcement environment at a second temperature smaller than about 500° C. thereby performing an ion-exchange treatment on the first-reinforced initial window member. The second reinforcement environment includes a second ion salt.

BRIEF DESCRIPTION OF THE DRAWINGS

A more complete appreciation of the present disclosure and many of the attendant aspects thereof will become readily apparent by reference to the following detailed description when considered in conjunction with the accompanying drawings wherein.

DETAILED DESCRIPTION OF THE DRAWINGS

Figure 1A:
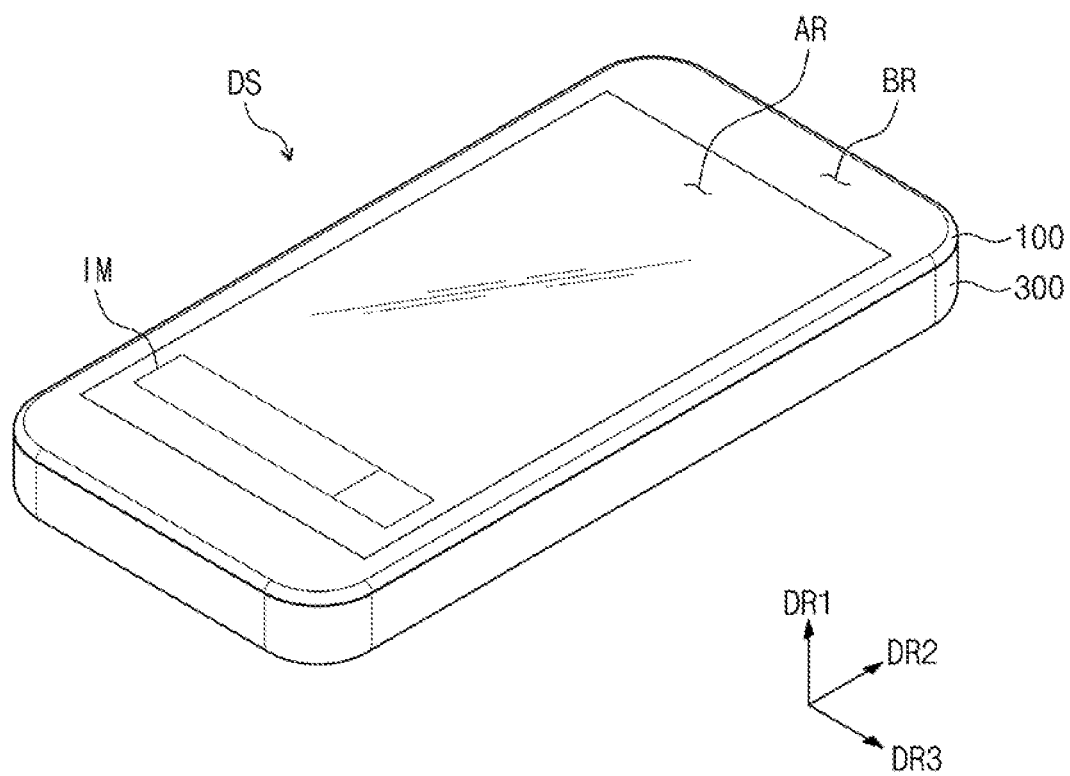
FIG. 1A is an assembled perspective view illustrating an electronic device according to an exemplary embodiment of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Hereinafter, the present invention will be explained in detail with reference to the accompanying drawings.

Figure 1B:
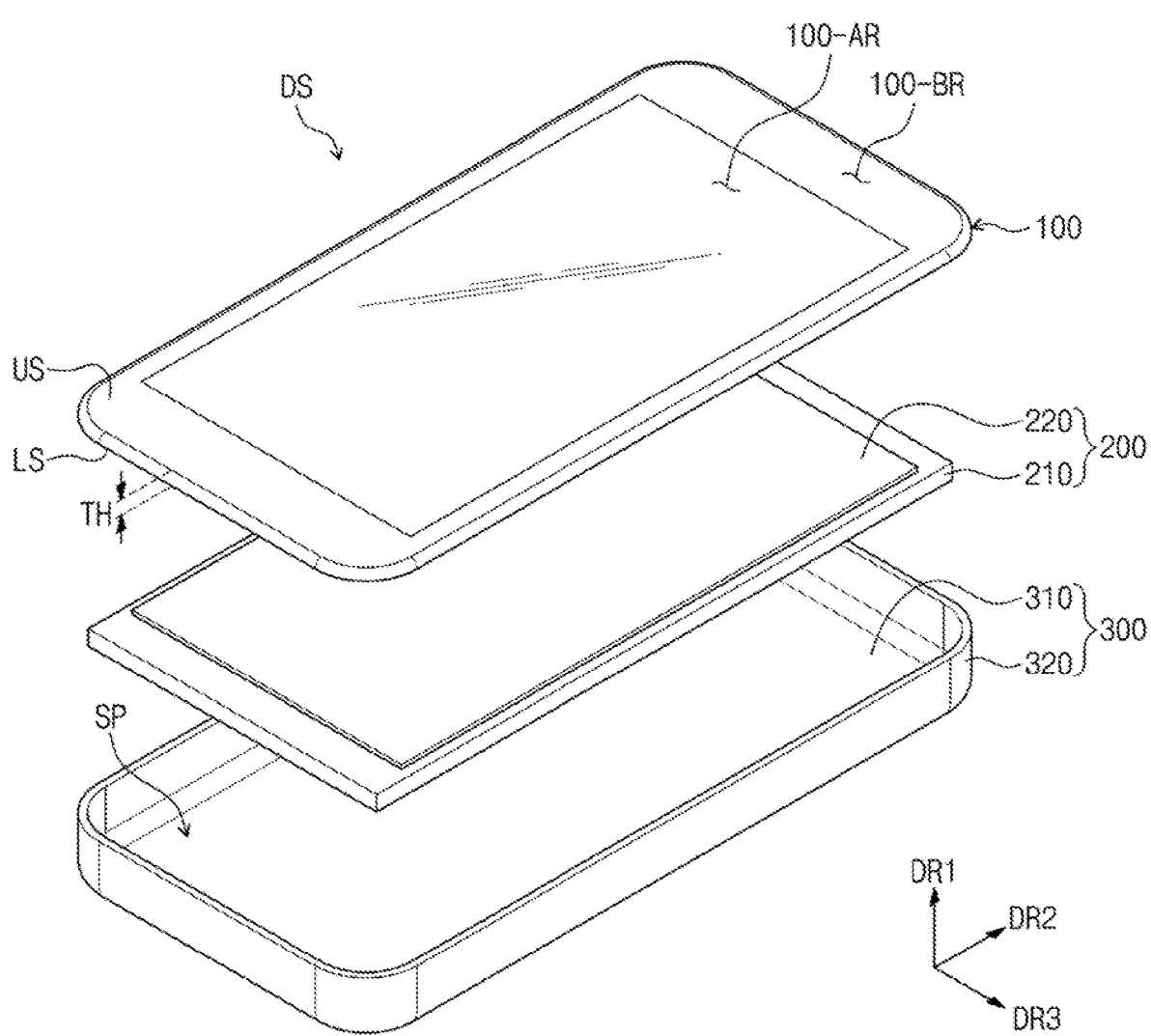
FIG. 1B is an exploded perspective view illustrating the electronic device shown in FIG. 1A.

FIG. 1A is an assembled perspective view illustrating an electronic device DS according to an exemplary embodiment of the present disclosure. FIG. 1B is an exploded perspective view illustrating the electronic device DS shown in FIG. 1A. The electronic device DS, according to exemplary embodiments of the present disclosure, will be described in detail with reference to FIGS. 1A and 1B.

Referring to FIG. 1A, the electronic device DS may have a three-dimensional shape with a predetermined thickness in a first direction DR1. The electronic device DS may include an active region AR and a peripheral region BR, which may surround the active region AR on at least one side thereof. The active region AR and the peripheral region BR may share a plane defined by a second direction DR2 and a third direction DR3, each of which may be substantially perpendicular to the first direction DR1.

The active region AR may be a region in which input and/or output functions of the electronic device DS are performed. According to an exemplary embodiment of the present disclosure, the electronic device DS may be, but is not limited to being, a display device. Accordingly, the active region AR displays an image IM when the electronic device DS is activated.

According to an exemplary embodiment of the present invention, the active region AR may be a region used to sense an external touch or ambient light after the electronic device DS is activated. Accordingly, the active region AR may be operated in various regions depending on components included in the electronic device DS and the present invention should not be limited to any one of the particular examples for ways in which the electronic device DS is utilized through the active region.

The peripheral region BR is disposed adjacent to the active region AR. For example, the peripheral region BR may have a shape surrounding an edge of the active region AR. However, the peripheral region BR might be adjacent to only a portion of the edge of the active region AR. Alternatively, the peripheral region BR may be omitted from the electronic device DS all together.

Referring to FIGS. 1A and 1B, the electronic device DS includes a window member 100, such as a window, a display member 200, such as a display, and an accommodation member 300, such as a frame or housing. The accommodation member 300, the display member 200, and the window member 100 may be sequentially arranged in the first direction DR1.

The window member 100 may be one of several external members of the electronic device DS. The window member 100 is coupled with the accommodation member 300 to define an inner region in which inner components are disposed. The inner components may be protected from external impacts and environmental contaminants within the inner region. For example, the window member 100 may define a front surface of the electronic device DS.

The window member 100 may include a rigid material. For example, the window member 100 may include a glass or plastic material. Accordingly, the window member 100 may protect the inner components of the electronic device DS from external impacts and environmental contaminants such as liquids, vapors, and reactive substances.

The window member 100 may be strengthened with the inclusion of ion salts. The ion salts may include a monovalent alkali ion. For example, the ion slats may include a sodium ion and a potassium ion. This will be described in detail later.

The window member 100 may include a first region 100-AR and a second region 100-BR, which are arranged on the plane defined by the second direction DR2 and the third direction DR3.

The first region 100-AR may be an optically transparent region. The first region 100-AR transmits the image IM generated by the display member 200 to allow the image IM to be recognized by a user. The active region AR may be substantially defined by and aligned with the first region 100-AR.

The second region 100-BR is disposed adjacent to the first region 100-AR. The second region 100-BR has a lower optical transmittance than that of the first region 100-AR, thereby making the second region 100-BR harder to see through than the first region 100-AR. The first region 100-AR may have a shape defined by the second region 100-BR. According to an exemplary embodiment of the present invention, the second region 100-BR may be omitted from the electronic device DS.

The window member 100 may include a first (upper) surface US and a second (lower) surface LS separated from the first surface US in the first direction DR1 on the plane defined by the second direction DR2 and the third direction DR3. The first surface US may be substantially parallel to the second surface LS.

The first surface US may define the front surface of the electronic device DS. The first surface US corresponds to a surface exposed to the user who uses the electronic device DS.

The second surface LS may be a surface facing the display member 200. The second surface LS is not exposed to the outside of the electronic device DS in the assembled perspective view shown in FIG. 1A.

The window member 100 may have a thickness TH defined in the first direction DR1. The thickness TH may correspond to a degree of separation between the first surface US and the second surface LS.

The window member 100 may be thin. For example, the thickness TH of the window member 100 may be equal to or smaller than about 0.5 mm. Although the window member 100 has the thickness of about 0.5 mm, the window member 100 may be sufficiently strong to withstand external impacts. This will be described in detail later. Since the electronic device DS, according to exemplary embodiments of the present invention, includes the thin window member 100, the electronic device DS may be slim, lightweight, and highly optically transparent, etc.

As discussed above, the window member 100 may be both thin and strong. Accordingly, the electronic device DS may be made relatively slim and resistant to damage caused by external impacts. This will be described in detail later.

The display member 200 may be disposed between the window member 100 and the accommodation member 300. The display member 200 generates the image IM. The image IM generated by the display member 200 may provide the user with information.

The display member 200 may include a base layer 210 and a device layer 220. The base layer 210 may include an insulating material. For example, the base layer 210 may be a glass substrate, a plastic substrate, or a stacked film including an organic layer and/or an inorganic layer, but the base layer is not limited to these components. For example, the base layer 210 according to the present exemplary embodiment may include various components and should not be limited to any one embodiment.

The device layer 220 may include various electrical devices activated in response to electrical signals. For example, the device layer 220 may include display devices to generate the image IM. For example, the device layer 220 may include an organic light emitting device, an electrowetting device, a liquid crystal capacitor, or an electrophoretic device.

According to an exemplary embodiment of the present invention, the device layer 220 may include a sensor device, such as a touch sensor, an optical sensor, etc. The device layer 220 may, for example, include various devices for performing various functions of the electronic device DS.

The accommodation member 300 may be one of the external members of the electronic device DS. The accommodation member 300 is coupled with the window member 100 to seal and protect the inner components from the external environment. For example, the accommodation member 300 may define a rear surface of the electronic device DS.

The accommodation member 300 may include a bottom portion 310 (e.g. backplate) and a sidewall portion 320. The bottom portion 310 and the sidewall portion 320 may define a predetermined inner space SP or cavity. The display member 200 may be accommodated within the inner space SP.

The bottom portion 310 may be substantially parallel to the plane defined by the second direction DR2 and the third direction DR3. However, the bottom portion 310 may alternatively be curved and/or may contain one or more openings or protruding features. The bottom portion 310 may overlap with at least the display member 200 when viewed in a plan view. The bottom portion 310 may have an area equal to or greater than an area of the display member 200.

The sidewall portion 320 is connected to the bottom portion 310 and extends from the bottom portion 310 in substantially the first direction DR1, although the sidewall portion 320 may alternatively be somewhat rounded so as to bulge outwardly. The sidewall portion 320 may define the thickness in the first direction DR1 of the electronic device DS. The sidewall portion 320 may surround an edge of the display member 200 in the assembled perspective of FIG. 1A.

The electronic device DS may further include various additional components accommodated in the inner space SP. For example, the electronic device DS may further include a component supplying a power to the display member 200, a component coupling the window member 100 with the display member 200, and a component coupling the display member 200 with the accommodation member 300. The electronic device DS may be provided in various structures including various components and should not be limited to a specific structures described herein as examples.

Figure 2A:
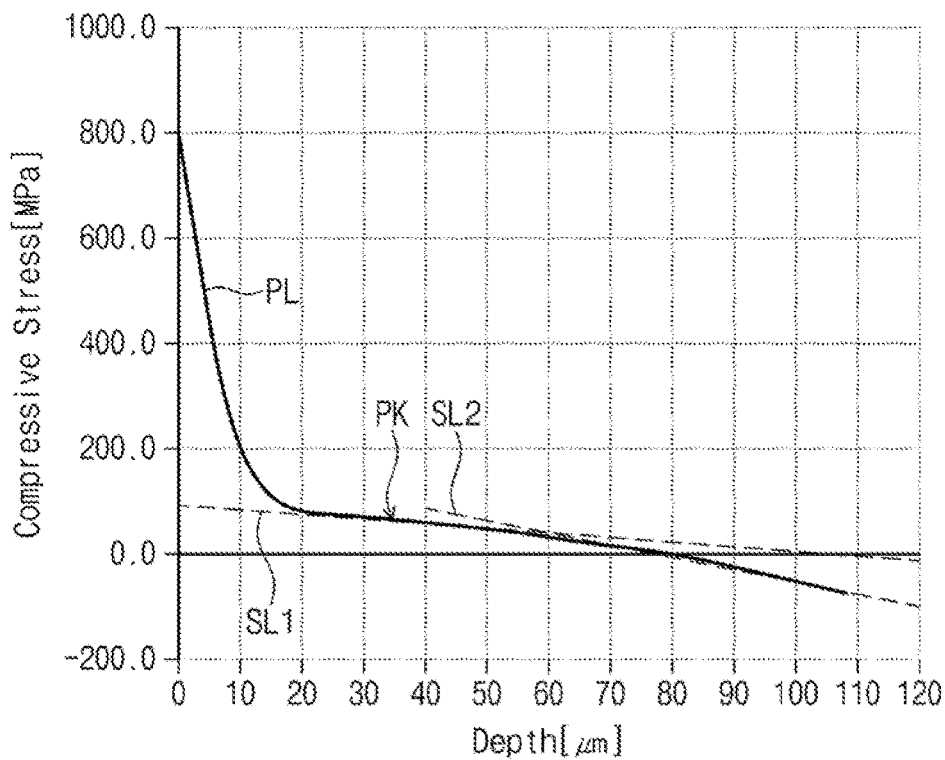
FIG. 2A is a graph illustrating a stress profile as a function of a depth of a window member according to an exemplary embodiment of the present disclosure.
Figure 2B:
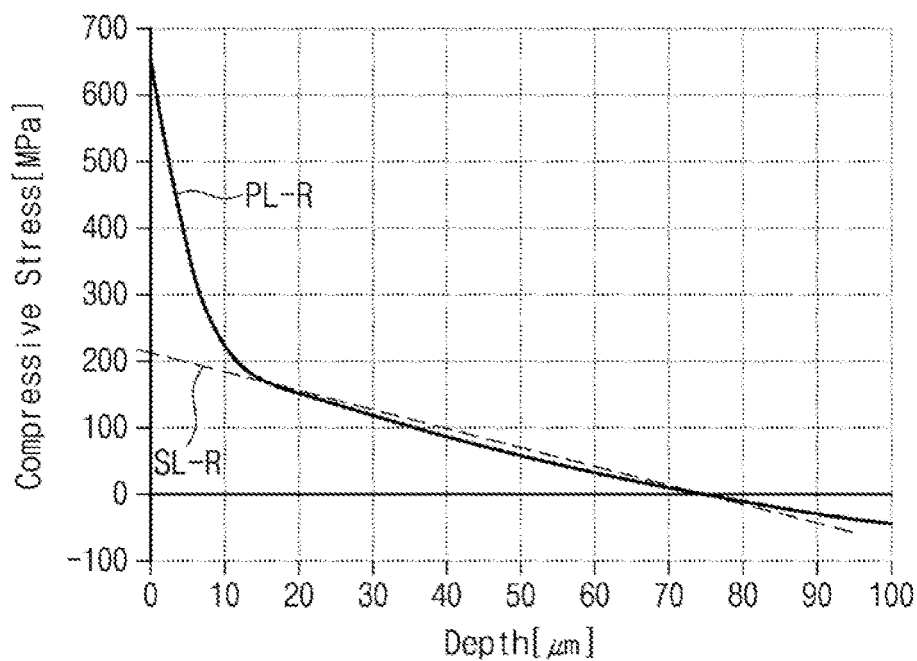
FIG. 2B is a graph illustrating a stress profile as a function of a depth of a window member according to a comparative embodiment.

FIG. 2A is a graph illustrating a stress profile as a function of a depth of a window member according to an exemplary embodiment of the present disclosure, and FIG. 2B is a graph illustrating a stress profile as a function of a depth of a window member according to a comparative embodiment. FIG. 2A relates to the properties of the window member 100 shown in FIG. 1B.

Referring to FIGS. 2A and 2B, a level of stress occurring in the window member 100 may vary depending on a depth. The depth may be defined as a distance between the first surface US (refer to FIG. 1B), corresponding to one surface of the surfaces of the window member 100, and a point that is spaced apart from the first surface US toward a center of the thickness of the window member 100 by a predetermined separation distance in the first direction DR1 (refer to FIG. 1B). Similarly, the depth may be defined as a distance between one surface among the surfaces of a comparative embodiment and a point that is spaced apart from the one surface toward a center of a thickness of the comparative embodiment.

The stress may be a stress at a point spaced apart from the surface of the window member 100 in a thickness direction of the window member 100 by a corresponding depth. Similarly, the stress may be a stress existing at a corresponding point in the comparative embodiment.

In FIGS. 2A and 2B, a type of the stress, which occurs in the window member and is caused by a depth, has been represented as a compressive stress.

As shown in FIGS. 2A and 2B, the compressive stress at a point at which the depth is zero (0) in the window member 100, e.g., at the point corresponding to the surface of the window member 100, may be referred to as a "surface compressive stress". In addition, in the window member 100, a point at which the compressive stress is zero (0) may be referred to as a "depth of compression". Hereinafter, a compressive stress behavior of the window member according to an exemplary embodiment of the present disclosure will be described in detail with reference to FIGS. 2A and 2B.

As shown in FIG. 2A, a compressive stress graph PL of the window member 100, according to an exemplary embodiment of the present disclosure, shows the surface compressive stress equal to about 800 MPa, and the depth of compression equal to about 80 micrometers.

As shown in FIG. 2B, according to a graph PL-R of the comparative embodiment, the surface compressive stress, which indicates the compressive stress at the point at which the depth is zero (0), is about 650 MPa, and the depth of compression is about 70 micrometers at a point at which the compressive stress is zero (0). For example, the window member 100, according to an exemplary embodiment of the present disclosure, has a higher surface compressive stress and a greater depth of compression than those of the comparative embodiment.

Referring to FIGS. 2A and 2B, when the graph PL of the present disclosure is compared to the graph PL-R of the comparative embodiment, the graph PL may be divided into a section with a large slope and a section with a small slope in a depth range equal to or smaller than the depth of compression. According to exemplary embodiments of the present invention, a magnitude of the slope is determined based on an absolute value.

For example, the graph PL of the present disclosure has a larger slope than that of the graph PL-R of the comparative embodiment in the depth range smaller than about 15 micrometers and has a smaller slope than that of the graph PL-R of the comparative embodiment in the depth range equal to or greater than about 15 micrometers.

Meanwhile, the graph PL of the present disclosure may include a point at which an absolute value of the slope is smaller than about 2 MPa/μm in the depth range equal to or smaller than the depth of compression. For example, a first slope SL1 is about 1 MPa/μm.

The graph PL-R of the comparative embodiment may include points at which absolute values of the slope is equal to or greater than about 2 MPa/μm in the depth range equal to or smaller than the depth of compression. For example, a second slope SL2 is about 2.62 MPa/μm.

The graph PL of the present disclosure may include a point at which the slope is zero (0). Accordingly, as shown in FIG. 2A, the graph PL of the present disclosure may include a peak point PK that is upwardly convex. According to some exemplary embodiments of the present invention, the graph PL of the present disclosure may have various shapes as long as the graph PL includes the point at which the absolute value of the slop is smaller than about 2 MPa/μm, and the graph PL of the present disclosure should not be limited to any one embodiment.

The graph PL, according to exemplary embodiments of the present disclosure, shows the surface compressive stress being higher than that of the graph PL-R of the comparative embodiment and quickly reaches the low compressive stress in the low depth due to the high slope. In addition, the graph PL, according to exemplary embodiments of the present disclosure, has the higher depth of compression than that of the graph PL-R of the comparative embodiment, but has the lower slope than that of the graph PL-R, thereby inducing a reduction of the compressive stress.

The stress applied to the window member 100 due to the compressive stress may correspond to an area defined by the graph PL. The stress applied to the window member 100 due to the compressive stress may be relieved by a negative compressive stress, e.g., a tensile force, which is generated in a depth range equal to or greater than the depth of compression. In this case, an inner tension formed to relieve the stress applied to the window member 100 may be referred to as a central tension.

As the stress applied to the window member 100 increases, the central tension generated in the depth range equal to or greater than the depth of compression increases. In this case, when the thickness of the window member 100 is reduced, the depth range equal to or greater than the depth of compression is not secured by a sufficient length. As a result, the central tension may rapidly increase, and the durability of the window member 100 may be lowered.

The window member 100, according to exemplary embodiments of the present disclosure, has the graph PL including the section with the larger slope and the section with the smaller slope than those of the comparative embodiment. Accordingly, although the graph PL has the higher compressive stress and the higher depth of compression than those of the graph PL-R of the comparative embodiment, an area smaller than an area formed by the graph PL-R of the comparative embodiment may be formed by controlling the slope.

Accordingly, the window member 100 may substantially simultaneously have the high depth of compression and the low central tension, and thus the window member 100 may me highly reliable and durable and provide adequate stability and protection even though the window member 100 is relatively thin. The window member 100, according to exemplary embodiments of the present disclosure, may be thin while being reinforced, and thus the window member 100 may contribute to the thinning of the electronic device DS.

Figure 3A:
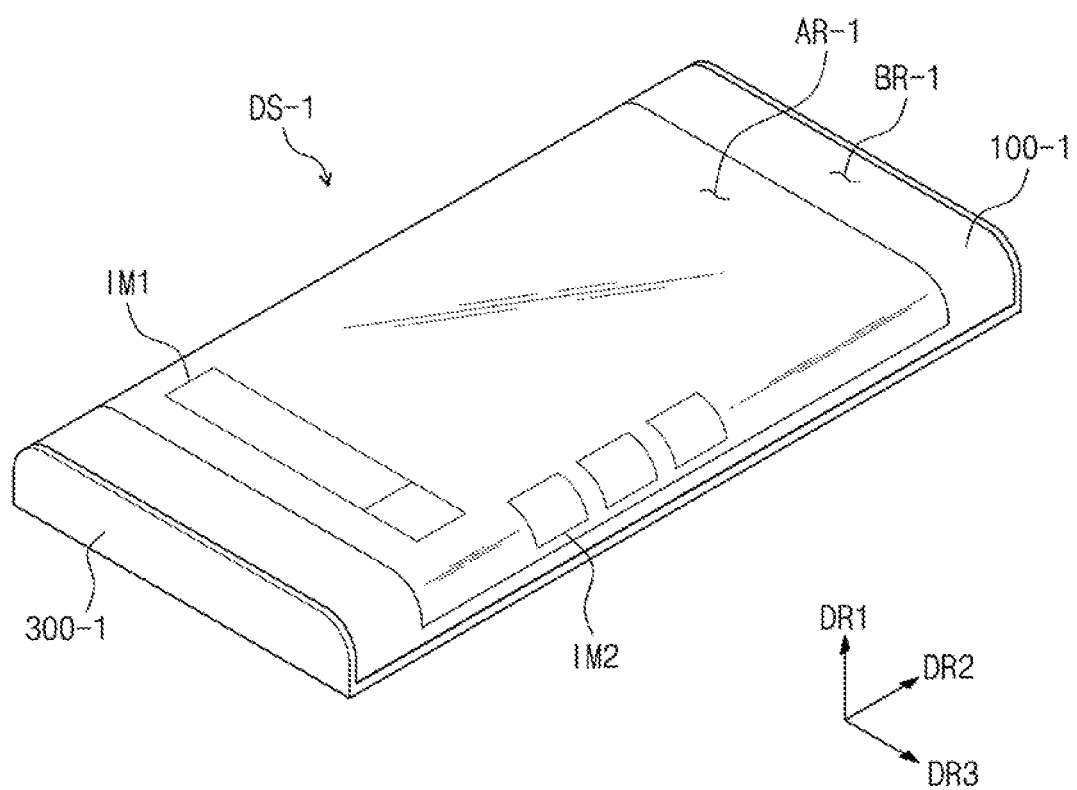
FIG. 3A is an assembled perspective view illustrating an electronic device according to an exemplary embodiment of the present disclosure.
Figure 3B:
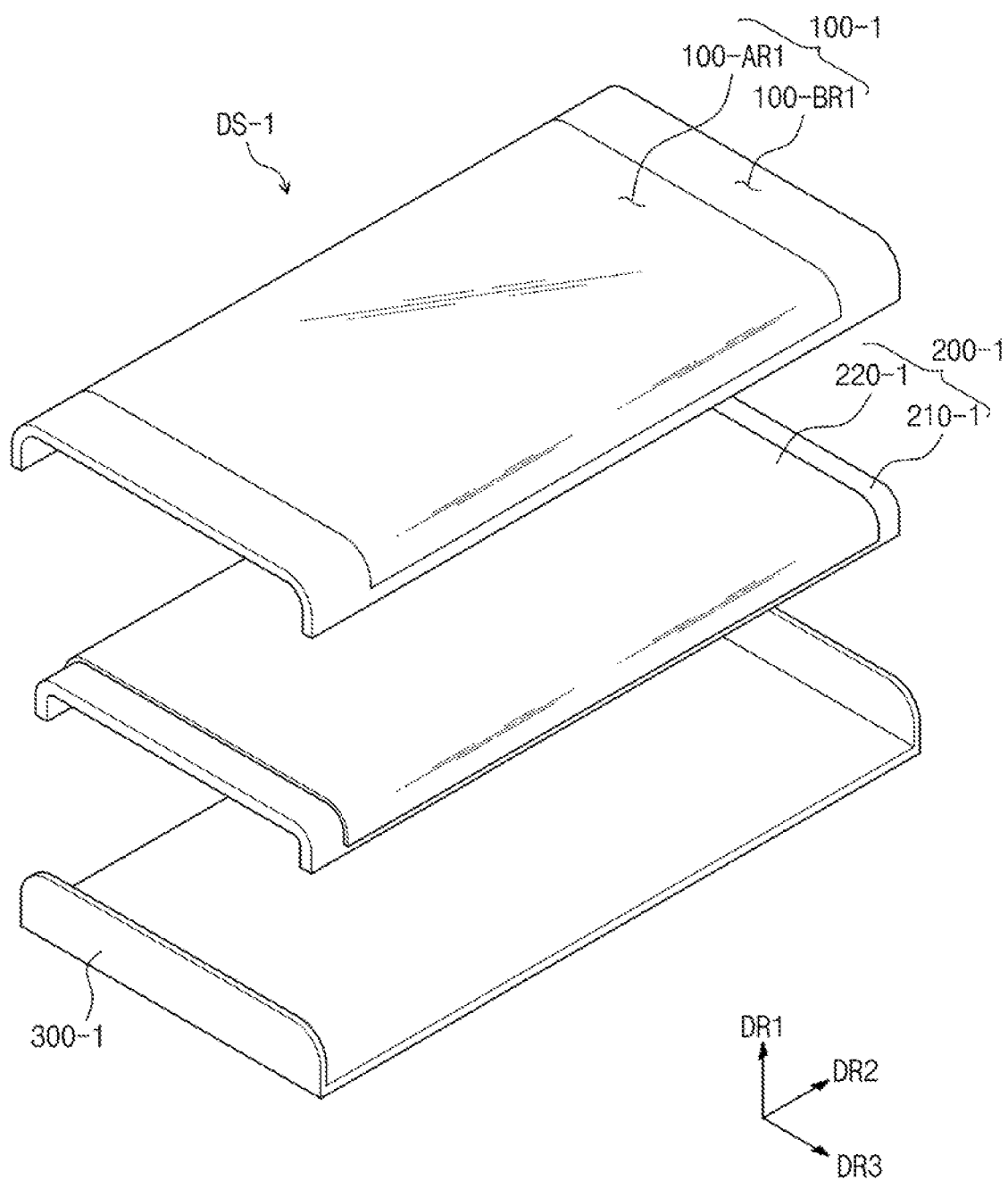
FIG. 3B is an exploded perspective view illustrating the electronic device shown in FIG. 3A.

FIG. 3A is an assembled perspective view illustrating an electronic device DS-1 according to an exemplary embodiment of the present disclosure, and FIG. 3B is an exploded perspective view illustrating the electronic device DS-1 shown in FIG. 3A. Hereinafter, the electronic device DS-1 will be described in detail with reference to FIGS. 3A and 3B. In FIGS. 3A and 3B, the same reference numerals may denote the same elements in FIGS. 1A to 2B, and thus to the extent that description is omitted, it may be assumed that the omitted description is at least similar to that of the corresponding elements already discussed.

Referring to FIG. 3A, the electronic device DS-1 may include an active region AR-1 and a peripheral region BR-1. The active region AR-1 may have a curved shape in a space defined by a first direction DR1, a second direction DR2 crossing the first direction DR1, and a third direction DR3 crossing the first direction DR1.

The peripheral region BR-1 is disposed adjacent to the active region AR-1. The peripheral region BR-1 may have a curved shape corresponding to that of the active region AR-1.

An image is displayed through the active region AR-1. For example, a first image IM1 and a second image IM2 may be displayed through the active region AR-1. The first image IM1 is displayed through a plane defined by the second direction DR2 and the third direction DR3 and provided to the first direction DR1. The second image IM2 is displayed through a plane defined by the first direction DR1 and the second direction DR2 and provided to the third direction DR3.

The electronic device DS-1, according to exemplary embodiments of the present disclosure, may display the image toward various directions through the active region AR-1 having the curved shape. Accordingly, the electronic device DS-1 may provide the user with various ways of using the electronic device DS-1.

As shown in FIGS. 3A and 3B, the electronic device DS-1 may include a window member 100-1, a display member 200-1, and an accommodation member 300-1. The window member 100-1 may have the curved shape bent downward from the plane defined by the second direction DR2 and the third direction DR3.

The window member 100-1 may include a first region 100-AR1 and a second region 100-BR1. The first region 100-AR1 may be substantially parallel to the plane defined by the second direction DR2 and the third direction DR3. The first region 100-AR1 may correspond to the active region AR-1.

The second region 100-BR1 may be a region bent downward from the first region 100-AR1. The second region 100-BR1 may be substantially parallel to the plane defined by the first direction DR1 and the second direction DR2. The second region 100-BR1 may correspond to the peripheral region BR-1.

The window member 100-1 may have the same structure and function as those of the window member 100 (refer to FIG. 1B) except that the window member 100-1 has the curved shape. Accordingly, to the extent that additional description is omitted, it may be assumed that the omitted description is at least similar to that of the corresponding window member 100 already discussed.

The display member 200-1 may be disposed between the window member 100-1 and the accommodation member 300-1. The display member 200-1 may have the curved shape bent downward from the plane defined by the second direction DR2 and the third direction DR3.

The display member 200-1 includes a base layer 210-1 and a device layer 220-1. The base layer 210-1 and the device layer 220-1 may have the curved shape bent downward from the plane defined by the second direction DR2 and the third direction DR3.

Since the device layer 220-1, according to exemplary embodiments of the present disclosure, has the curved shape, first and second images IM1 and IM2 may be generated. These images may be displayed in different direction, with the first image IM1 being displayed substantially in the DR1 direction and the second image IM2 being displayed substantially in the D3 direction. Accordingly, the display member 200-1 may provide the images toward various directions and increase the usability of the electronic device DS-1.

The accommodation member 300-1 is disposed under the display member 200-1. The accommodation member 300-1 is coupled with the window member 100-1 to define a portion of the exterior of the electronic device DS-1 and protect inner components of the electronic device DS-1. The accommodation member 300-1 has a shape that may be coupled with various shapes of the display member 200-1, and thus the display member 200-1 and other additional components may be accommodated in the electronic device DS-1.

As described above, the electronic device DS-1, according to exemplary embodiments of the present disclosure, includes the window member 100-1 having the curved shape, and thus the display member 200-1 having various shapes and other electrical components may be protected from contamination by the external environment. In addition, since the window member 100-1 may secure a mechanical strength while having various shapes, the reliability of the electronic device DS-1 may be increased.

Figure 4:
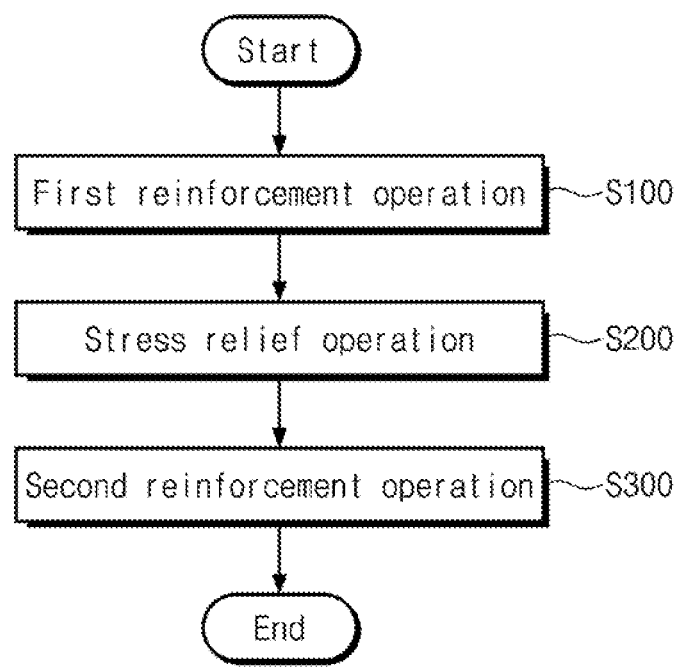
FIG. 4 is a flowchart illustrating a method of manufacturing a window member according to an exemplary embodiment of the present disclosure.

FIG. 4 is a flowchart illustrating a method of manufacturing a window member according to an exemplary embodiment of the present disclosure. FIGS. 5A to 5G are cross-sectional views illustrating a method of manufacturing a window member according to an exemplary embodiment of the present disclosure. For the convenience of explanation, FIGS. 5A to 5G show a variation on a cross-section defined by the first direction DR1 and the third direction DR3.

Hereinafter, the manufacturing method of the window member will be described in detail with reference to FIGS. 4 and 5A to 5G. In FIGS. 4 and 5A to 5G, the same reference numerals denote the same elements in FIGS. 1A to 3B, and thus to the extent that description is omitted, it may be assumed that the omitted description is at least similar to that of the corresponding elements already discussed.

Referring to FIG. 4, the method of manufacturing the window member 100, according to exemplary embodiments of the present disclosure may include a first reinforcement operation S100, a stress relief operation S200, and a second reinforcement operation S300.

The first reinforcement operation S100 may include an ion exchange operation. The manufacturing method of the window member 100, according to exemplary embodiments of the present disclosure, may form a first window member 100-S1 from an initial window member 100-I through the first reinforcement operation S100.

Figure 5A:
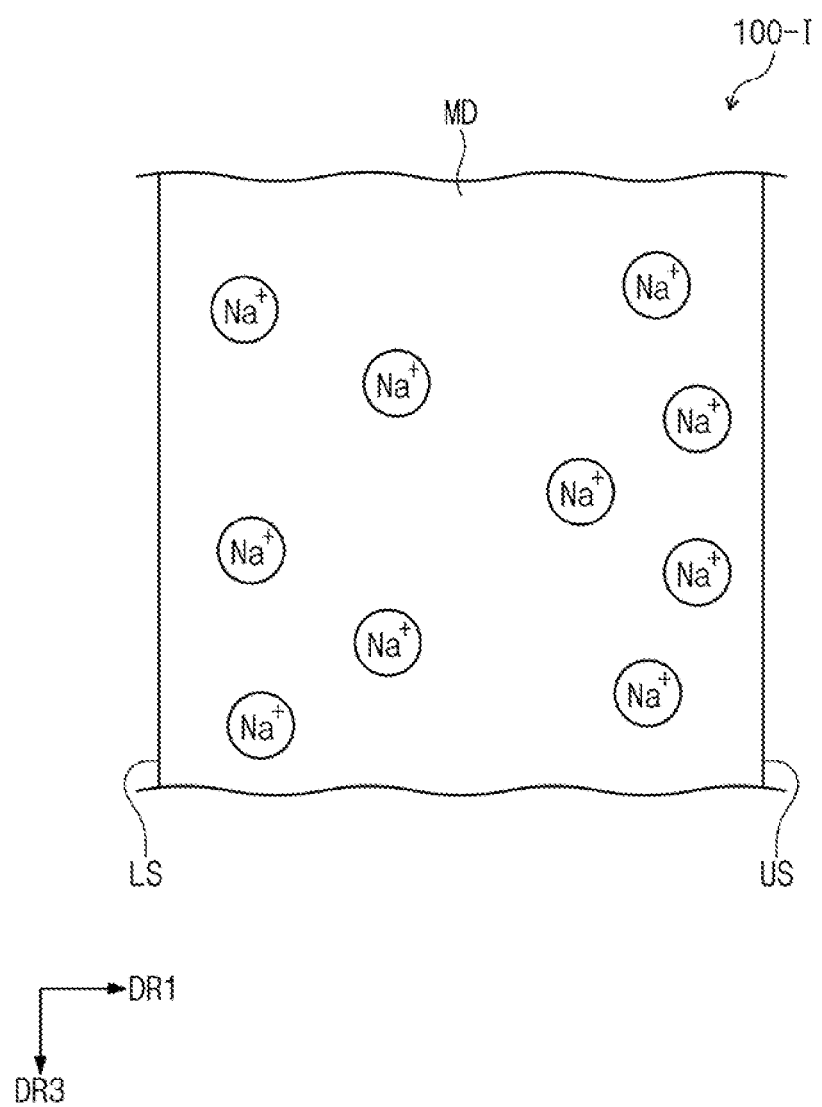
FIGS. 5A to 5G are cross-sectional views illustrating a method of manufacturing a window member according to an exemplary embodiment of the present disclosure.
Figure 5B:
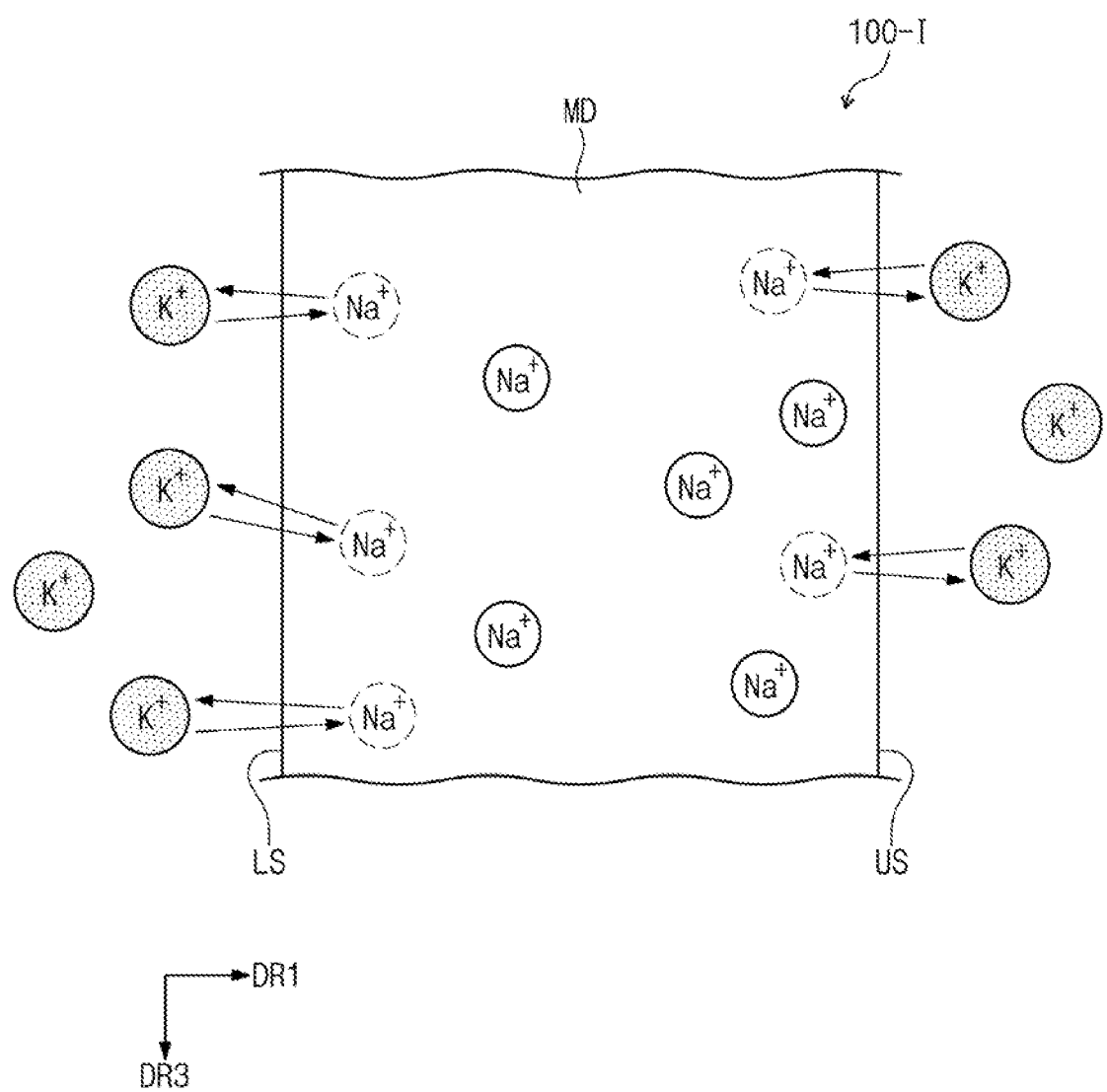
Figure 5C:
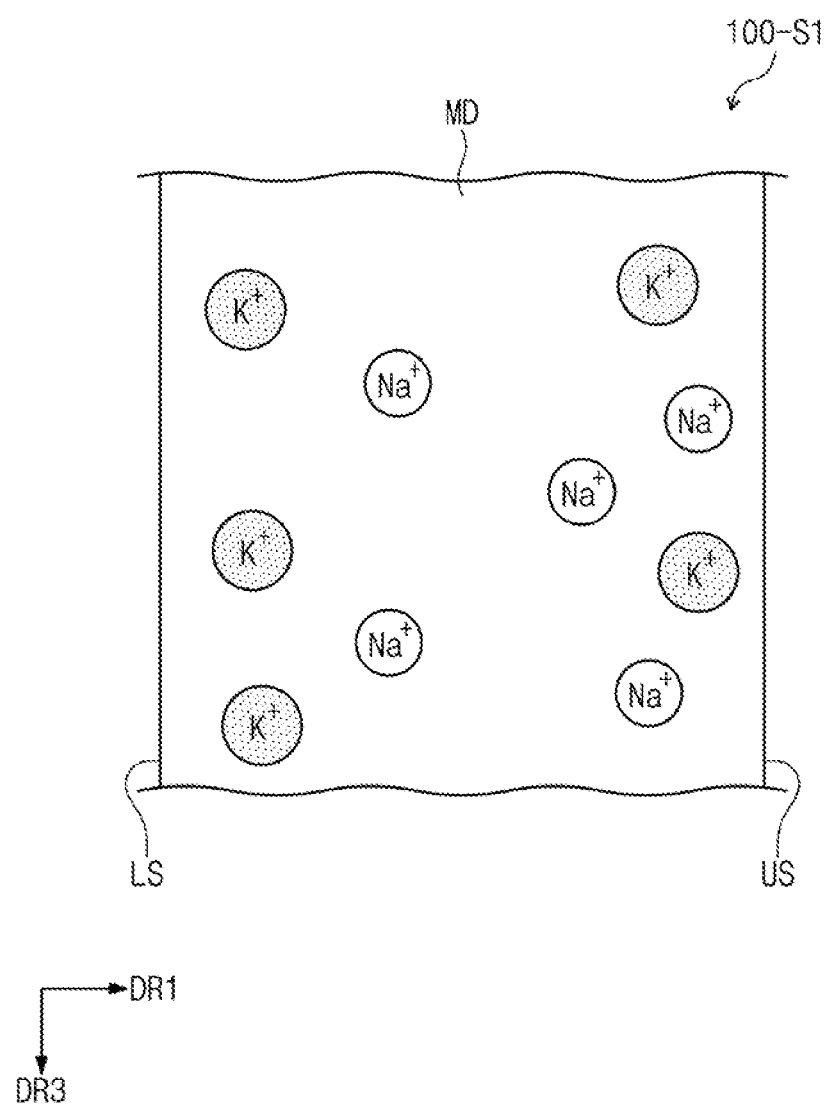
Figure 5D:
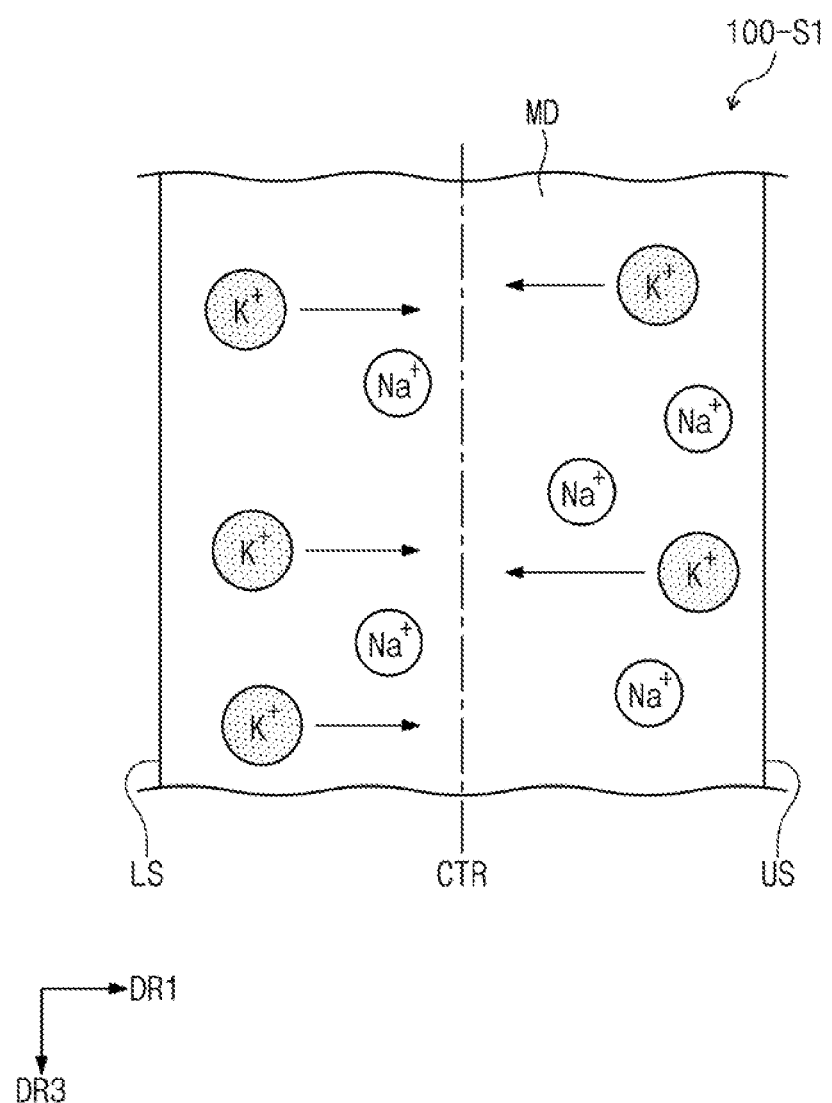
Figure 5E:
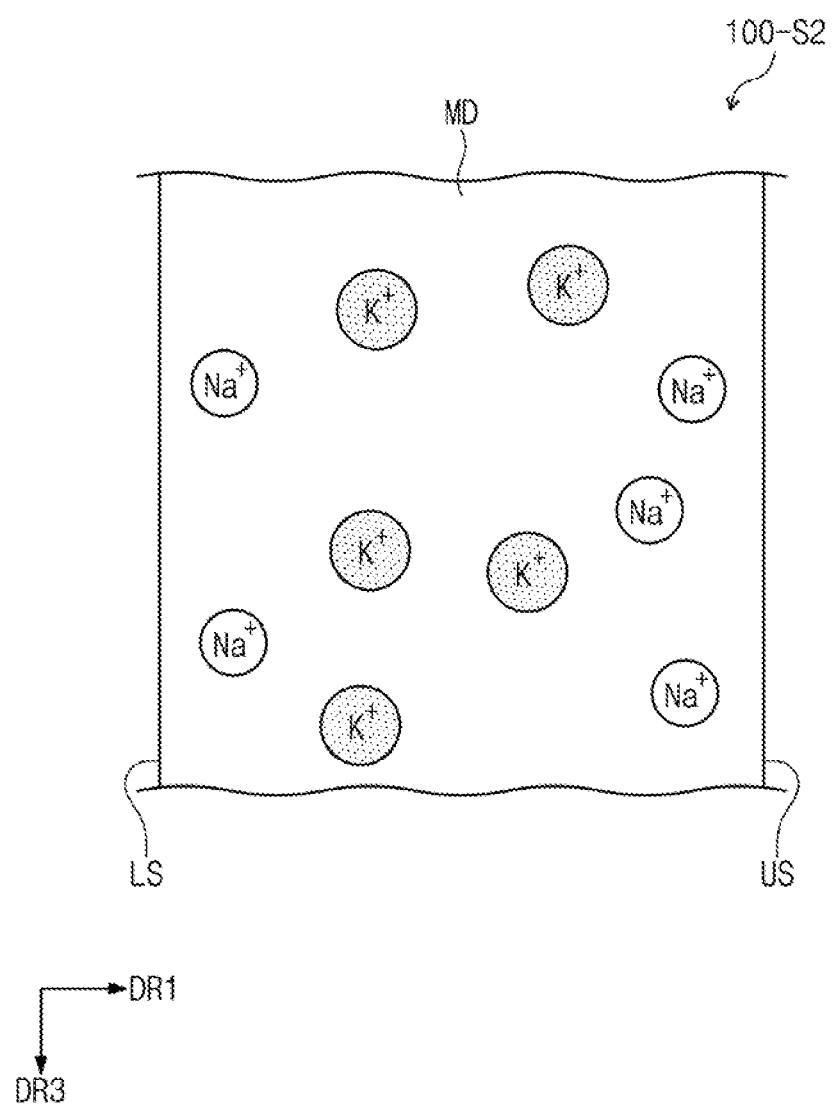
Figure 5F:
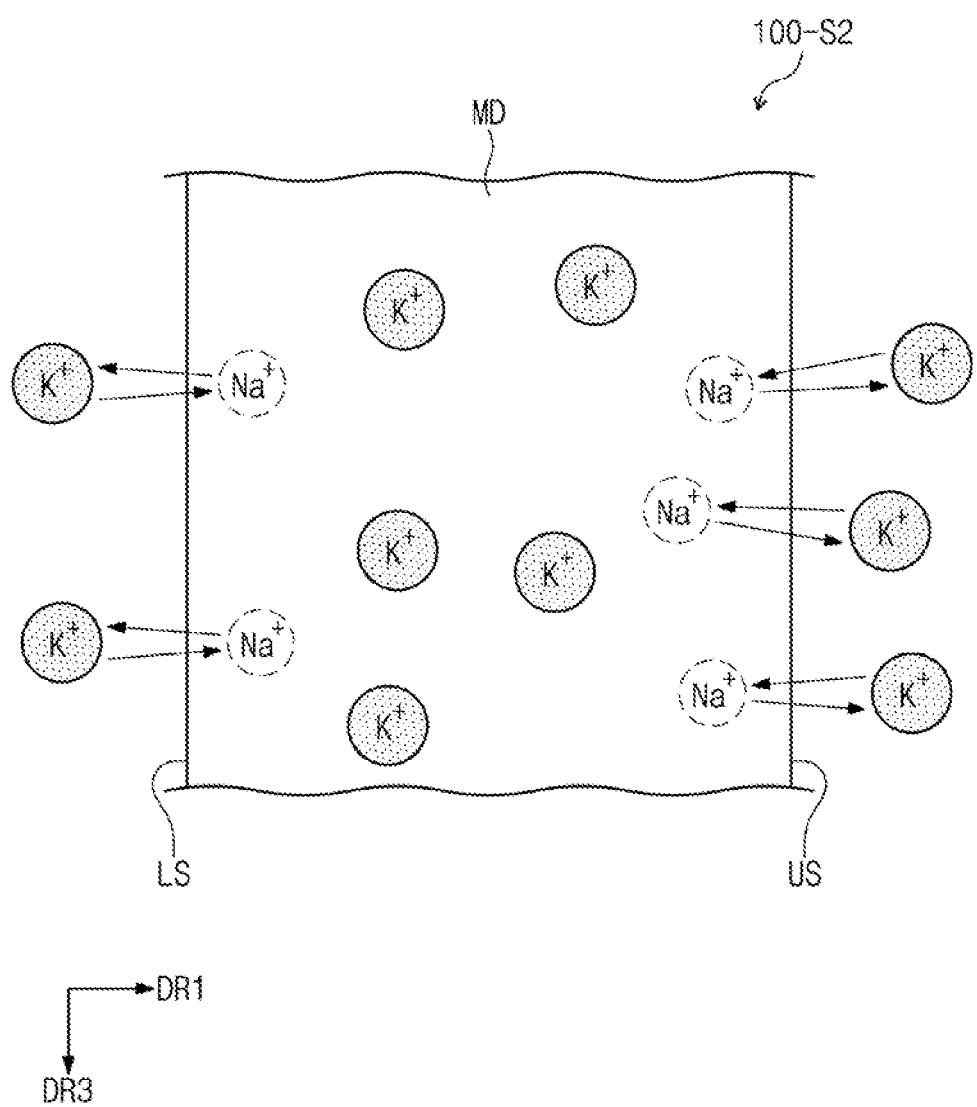

FIGS. 5A to 5C may correspond to the first reinforcement operation S100. The first reinforcement operation S100 may be an operation that reinforces the initial window member 100-I.

The initial window member 100-I may include a rigid insulating substrate. For example, the initial window member 100-I may be a glass substrate.

For example, as shown in FIG. 5A, the initial window member 100-I may include a medium MD and a plurality of sodium ions ($Na^+$). The sodium ions ($Na^+$) may be distributed (e.g. dissolved or otherwise mixed or suspended) within the medium MD (solvent or another carrier material).

The initial window member 100-I may be a glass substrate from which lithium oxide ($Li_2O$), boric oxide ($B_2O_3$), or phosphorus pentoxide ($P_2O_5$) is removed. The initial window member 100-I, according to exemplary embodiments of the present disclosure, may include a glass substrate formed of various materials without being limited to a specific material.

The first reinforcement operation S100 may include an ion exchange treatment. Accordingly, the first reinforcement operation S100 may treat the initial window member 100-I with a salt containing predetermined ionic salts.

In particular, as shown in FIGS. 5B and 5C, a plurality of potassium ions ($K^+$) is provided to the initial window member 100-I to form the first window member 100-S1. The first window member 100-S1 may include the medium MD and the sodium ions ($Na^+$) and the potassium ions ($K^+$), which are distributed in the medium MD. The potassium ions ($K^+$) may be ions substituted for the sodium ions ($Na^+$) distributed in the medium MD.

The potassium ions ($K^+$) may be provided in a variety of ways. For example, the potassium ions ($K^+$) may be provided in a state of ionic liquid.

For example, the initial window member 100-I is exposed to a molten salt to provide the potassium ions ($K^+$) existing in the molten salt to the initial window member 100-I. The molten salt may be a mixed salt.

For example, the molten salt may be a mixed salt in which sodium nitrate ($NaNO_3$) is mixed with potassium nitrate (KNO$_3$). At least a portion of the potassium ions (K$^+$) existing in the molten salt infiltrates into the initial window member 100-I to be substituted for the sodium ions (Na$^+$) in a one-to-one correspondence.

In this case, the molten salt may be provided to the first surface US and the second surface LS. Since the molten salt is provided in a liquid state, the surface of the initial window member 100-I may be exposed to the potassium ions (K$^+$). The potassium ions (K$^+$), according to exemplary embodiments of the present disclosure, may be provided in various methods, and the method of providing the potassium ions (K$^+$) should not be limited to any one embodiment.

For example, the ions provided to the initial window member 100-I may be provided in various embodiments as long as the ions are able to be substituted for the sodium ions (Na$^+$). For example, the ions provided to the initial window member 100-I may be monovalent positive ions having the same outermost electron number as the sodium ions (Na$^+$).

The potassium ions (K$^+$) have a relatively large ion radius compared to the sodium ions (Na$^+$). Accordingly, the potassium ions (K$^+$) larger than the sodium ions (Na$^+$) are provided to positions at which the sodium ions (Na$^+$) are placed, and the compressive stress is generated with respect to the medium MD.

The compressive stress provided by the potassium ions (K$^+$) may cause the surface compressive stress on the surface, i.e., the first surface US and the second surface LS, of the initial window member 100-I. Thus, the first window member 100-S1 may have a predetermined surface compressive stress.

The potassium ions (K$^+$) injected into the initial window member 100-I from the outside of the initial window member 100-I may enter the initial window member 100-I from the surface thereof to a predetermined depth. The predetermined depth may indicate a separation distance between the first surface US or the second surface LS and a potassium ion farthest apart from the first surface US or the second surface LS among the potassium ions (K$^+$) in the first direction DR1. Accordingly, the first window member 100-S1 may have a predetermined depth of compression. As described above, the depth of compression may correspond to the depth at which the compressive stress becomes zero (0).

A temperature at the first reinforcement operation S100 is carried out may be related to a distortion point of the initial window member 100-I. The first reinforcement operation S100 may be carried out at a temperature of about ±20° C. with respect to a temperature that is lower than the distortion point by about 50° C. The distortion point may be changed depending on a material or a crystal structure of the initial window member 100-I.

For example, in a case that the distortion point of the initial window member 100-I is about 580° C., the first reinforcement operation S100 may be carried out at a temperature of about 500° C. or above. The first reinforcement operation S100, according to exemplary embodiments of the present disclosure, performs the ion exchange at a relatively high temperature, and thus the potassium ions (K$^+$) may infiltrate into the initial window member 100-I, and the ion exchange may be active.

The temperature of the first reinforcement operation S100, according to the present disclosure, may be higher than a temperature range of a slow-cooling temperature for a manufacturing method of a conventional reinforced glass. In the case that the first reinforcement operation S100 is performed on the initial window member 100-I having the distortion point of about 580° C. at the temperature equal to or lower than about 500° C., the depth of compression of the initial window member 100-I may be lower than that at the temperature higher than 500° C. with respect to the same exposure time. In order to increase the compressive stress or the depth of compression, the exposure time is increased. Accordingly, a process efficiency is deteriorated, and a manufacturing cost increases.

Then, as shown in FIG. 4, the stress relief operation S200 may be performed. The stress relief operation S200 may correspond to FIGS. 5D and 5E. The stress relief operation S200 relieves the compressive stress of the initial window member (hereinafter, referred to as a "first window member") 100-S1, which is first-reinforcement treated, to form an initial window member (hereinafter, referred to as a "second window member") 100-S2 that is stress-relief treated. The second window member 100-S2 may have the compressive stress lower than that of the first window member 100-S1.

The manufacturing method of the window member, according to exemplary embodiments of the present disclosure, may control a movement of the potassium ions (K$^+$) through the stress relief operation S200. For example, referring to FIGS. 5D and 5E, the potassium ions (K$^+$) may move to a center portion CTR in thickness direction of the first window member 100-S1 in the stress relief operation S200.

When the potassium ions (K$^+$) providing the compressive stress move to the center portion CTR from the first and second surfaces US and LS, influences exerted on the first and second surfaces US and LS by the sources of the surface compressive stress may be reduced. Accordingly, the surface compressive stress measured at each of the first and second surfaces US and LS of the second window member 100-S2 may be lower than that of the first window member 100-S1. In this case, the surface compressive stress of the second window member 100-S2 may be smaller than about 150 MPa.

When the potassium ions (K$^+$) providing the compressive stress move to the center portion CTR from the first and second surfaces US and LS, a point with a compressive stress greater than the surface compressive stress may exist inside the second window member 100-S2. Since the potassium ions (K$^+$) providing the compressive stress move to be adjacent to the center portion CTR through the stress relief operation S200, a point having a maximum compressive stress may move to the center portion CTR from the first and second surfaces US and LS.

In this case, the potassium ions (K$^+$) may move to a deeper depth of the second window member 100-S2 from the surface than that in the first window member 100-S1. Accordingly, the depth of compression of the second window member 100-S2 may be larger than the depth of compression of the first window member 100-S1. The depth of compression of the second window member 100-S2 may exert influence on the depth of compression of the window member 100 described later.

For example, the stress relief operation S200 may include a heat treatment operation. The heat treatment operation may be performed at a temperature of about 500° C. or above. As the temperature increases, a time during which the first window member 100-S1 is exposed to a heat source may be shortened.

In this case, the stress relief operation S200 may further include a salt treatment operation. The salt treatment operation may be performed at substantially the same time as the heat treatment operation. For example, the heat treatment operation may be performed while the first window member 100-S1 is exposed to a liquid salt.

The liquid salt may be a mixed salt in which a salt containing the potassium ions is mixed with a salt containing the sodium ions. The stress relief operation S200 may form the second window member 100-S2 having various durabilities by controlling a mixing ratio of the mixed salt. For example, the mixing ratio of the salt containing the sodium ions increases, the second window member 100-S2 having the relatively high surface compressive stress may be formed. However, the stress relief operation S200 may be performed through various methods and should not be limited to any one embodiment. It is understood herein that mixing ratios may be based on either weight or moles.

Then, as shown in FIG. 4, the second reinforcement operation S300 may be performed. The second reinforcement operation S300 may correspond to FIGS. 5F and 5G. The second reinforcement operation S300 may be an operation that performs an ion-exchange treatment on the second window member 100-S2 to reinforce the second window member 100-S2. The initial window member 100 (hereinafter, referred to as a "window member"), which is second-reinforcement treated, may correspond to the window member 100 shown in FIG. 1A.

For example, the ion salt is provided to the second window member 100-S2 to form the window member 100. The ion salt may be ions substituted for the sodium ions ($Na^+$) distributed in the medium MD.

For example, the ion salt may include the potassium ions ($K^+$). The ion salt provided to the second window member 100-S2 in the second reinforcement operation S300 may be different from the ion salt provided to the initial window member 100-I in the first reinforcement operation S100.

The ion salt may be provided to the second window member 100-S2 through various methods in the second reinforcement operation S300. For example, the ion salt may be provided by using a single salt. For example, the potassium ions ($K^+$) may be provided to the second window member 100-S2 using potassium nitrate ($KNO_3$). However, the ion salt in the second reinforcement operation S300 may be provided as the mixed salt and should not be limited to any one embodiment.

Figure 5G:
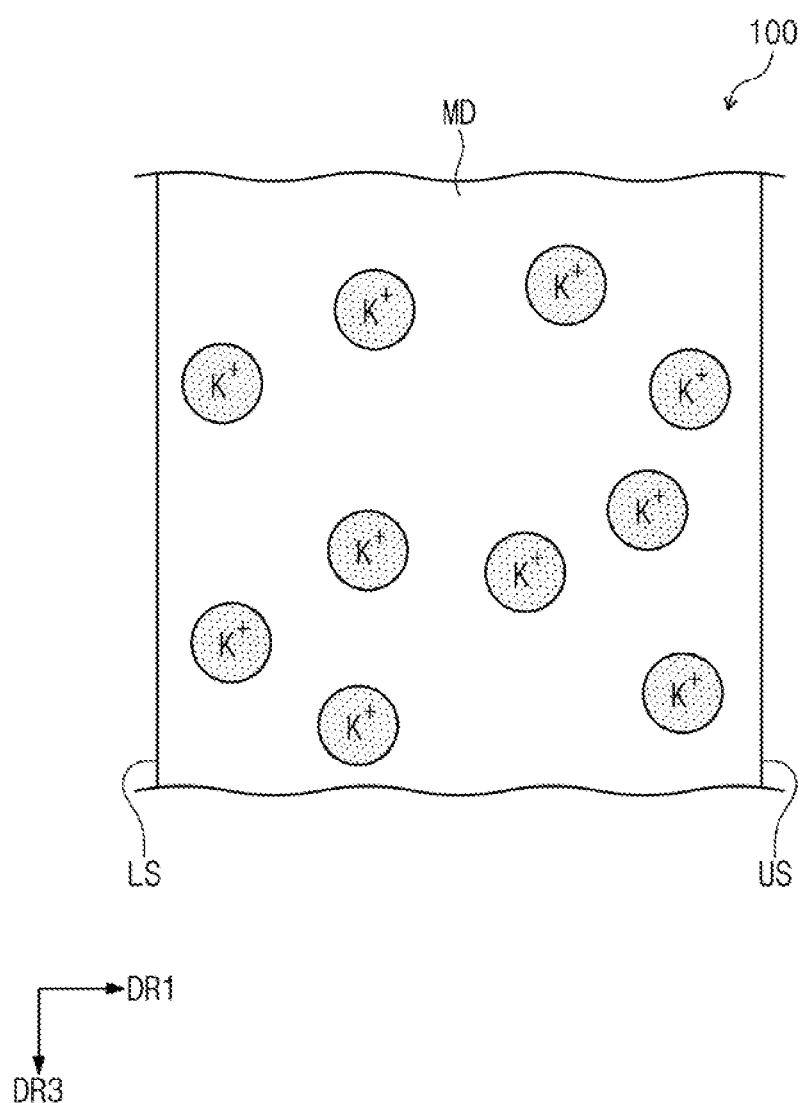

As shown in FIG. 5G, the window member 100 includes the potassium ions ($K^+$) disposed therein. The window member 100 may include the sodium ions ($Na^+$) that are not substituted for the potassium ions ($K^+$).

The window member 100 has the surface compressive stress higher than the surface compressive stress of the second window member 100-S2 by the second reinforcement operation S300. The surface compressive stress higher than the surface compressive stress of the second window member 100-S2 may be provided by the potassium ions ($K^+$) injected in the second reinforcement operation S300.

The surface compressive stress of the window member 100, according to exemplary embodiments of the present disclosure, may be higher than the surface compressive stress of the first window member 100-S1. The first window member 100-S1, after the stress relief operation S200, may allow the ion salts provided from an external source to be more easily injected thereto than the initial window member 100-I. The window member, 100 according to exemplary embodiments of the present disclosure, has more ability to accommodate surface compressive stress than the first window member 100-S1, and thus the window member 100 may be durable against external impacts and have increased reliability.

According to exemplary embodiments of the present disclosure, the window member 100 may have various sizes as long as the window member has the surface compressive stress higher than the surface compressive stress of the second window member.

Figure 6:
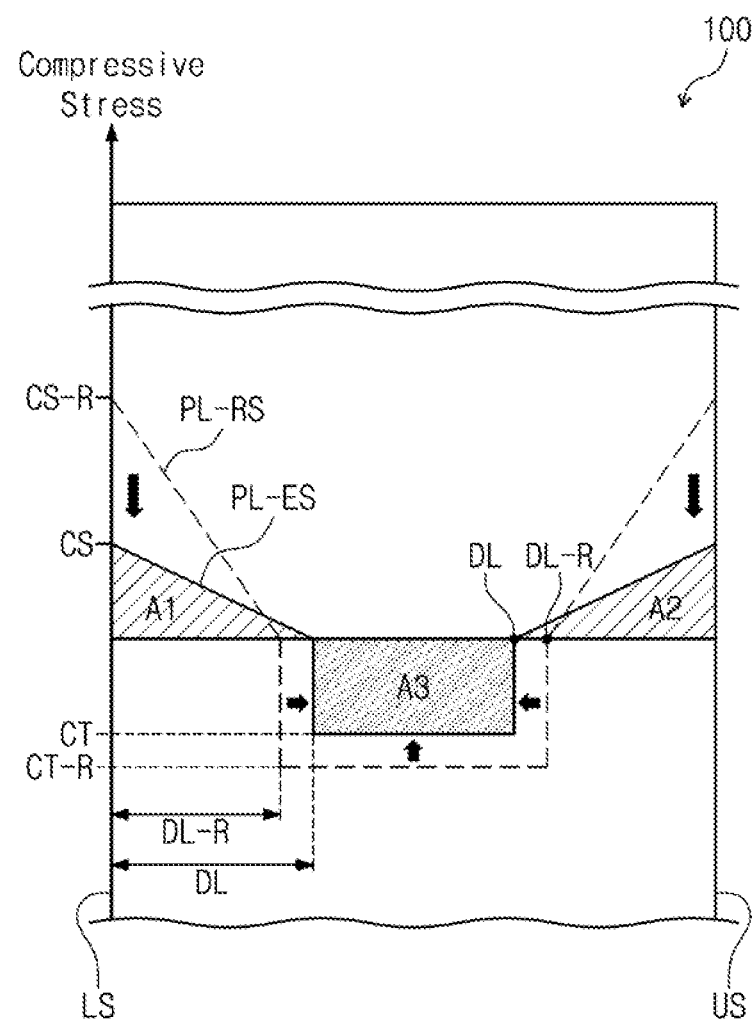
FIG. 6 is a graph illustrating a variation in stress of a window member according to an exemplary embodiment of the present disclosure.
Figure 6:
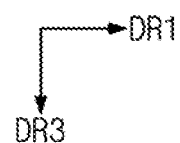

FIG. 6 is a graph illustrating a variation in stress of a window member according to exemplary embodiments of the present disclosure. FIG. 6 shows a graph PL-ES representing a variation in compressive stress as a function of a depth of a window member 100 according to an exemplary embodiment of the present disclosure and a graph PL-RS representing a variation in compressive stress as a function of a depth of a window member according to a comparative embodiment.

For the convenience of explanation, a cross-section of the window member 100 and graphs PL-ES and PL-RS are shown together, and the graph PL-RS of the comparative embodiment is indicated by a dotted line, and the graph PL-ES of the present disclosure is indicated by a solid line. The window member 100 may correspond to the window member 100 shown in FIG. 1B. Hereinafter, the variation in stress of the window member will be described in detail with reference to FIG. 6.

The compressive stress appearing in the window member 100 may be changed depending on the depth. In this case, the depth indicates a distance in a depth direction toward an inner side of the window member 100 from a surface of the window member 100, and the depth direction may correspond to a direction toward the inner side of the window member 100 along a direction substantially parallel to the first direction DR1 from the first surface US and the second surface LS facing the first surface US in the first direction DR1.

Accordingly, the depth may be defined to be bilaterally symmetrical with reference to a line extending along the third direction DR3 and crossing a point corresponding to a half of the thickness of the window member 100. A center line that is a reference line of the bilateral symmetry may correspond to the center line CTR shown in FIG. 5D.

The window member 100 may have a first surface compressive stress CS on the first surface US and the second surface LS. In FIG. 6, the compressive stress on the first surface US is substantially the same as the compressive stress on the second surface LS, but the compressive stress on the first surface US may be different from the compressive stress on the second surface LS.

The window member 100 may have a first depth of compression DL. As described above, the first depth of compression DL may correspond to a depth at which the compressive stress becomes zero (0).

The window member 100 may have different stresses from each other around the first depth of compression DL. The window member 100 may have the compressive stress at a depth smaller than the first depth of compression DL and a tension at a depth greater than the first depth of compression DL.

The tension may be an inner tension formed against the compressive stress. Since the window member 100 forms the tension against the compressive stress, a deformation of the window member 100 caused by the compressive stress may be reduced, and the stress may be balanced. For example, the tension is shown as a negative compressive stress.

The window member 100 may have a first central tension CT at a depth greater than the first depth of compression DL. For the convenience of explanation, the first central tension CT is shown to have a constant value in a range of the depth greater than the first depth of compression DL in FIG. 6. However, according to some exemplary embodiments of the present disclosure, the window member 100 may have a tension that is variable in the range of the depth greater than the first depth of compression DL, and in this case, the first central tension CT may be defined as an average value of tensions in the range of the depth greater than the first depth of compression DL.

For example, an area formed by the graph PL-ES of the present disclosure in the range of the first depth of compression DL may be substantially the same as an area formed by the graph PL-ES of the present disclosure in the range of the depth greater than the first depth of compression DL. For example, a sum of a first area A1 defined by the compressive stress in the range of the first depth of compression DL from the second surface LS and a second area A2 defined by the compressive stress in the range of the first depth of compression DL from the first surface US may be substantially the same as a third area A3 defined by the tension in the range of depth greater than the first depth of compression DL.

The window member 100, according to exemplary embodiments of the present disclosure, forms the graph PL-ES defining the third area A3 defined by the tension such that the third area A3 is the same as the sum of the first and second areas A1 and A2 defined by the compressive stress, and thus the window member 100 may be prevented from being damaged due to the compressive stress during the reinforcement operation. Accordingly, the reinforcement operation may be performed on the window member 100, and the window member 100 may have increased durability.

When compared to the graph PL-RS of the comparative embodiment, the first surface compressive stress CS of the window member 100 may be lower than the surface compressive stress CS-R of the comparative embodiment. The first depth of compression DL of the window member 100 may be greater than the depth of compression DL-R of the comparative embodiment.

Accordingly, when the graph PL-ES of the present disclosure is compared to the graph PL-RS of the comparative embodiment, the slope of the variation in the compressive stress may be lowered in the range of the first depth of the compression DL. When the first depth of compression DL becomes greater than the depth of compression DL-R of the comparative embodiment, the slope may be reduced, and the area defined by the compressive stress in the range of the depth of compression may be more reduced than that in the graph PL-RS of the comparative embodiment.

Thus, an intensity of the tension required in the range of the depth equal to or greater than the first depth of compression DL may be reduced. For example, the first central tension CT in the present disclosure may be smaller than a central tension CT-R in the comparative embodiment. Since the area defined by the compressive stress in the range of the depth of compression DL is reduced, the balance of the stress may be maintained even though the first central tension CT is low.

The increasing of the first depth of compression DL and the decreasing of the intensity of the first surface compressive stress CS may be achieved through the stress relief operation S200 (refer to FIG. 4). The manufacturing method of the window member, according to exemplary embodiments of the present disclosure, further includes the stress relief operation S200 to form the window member 100 having the high depth of compression and the low central tension, and thus the window member having the increased durability may be formed.

Figure 7A:
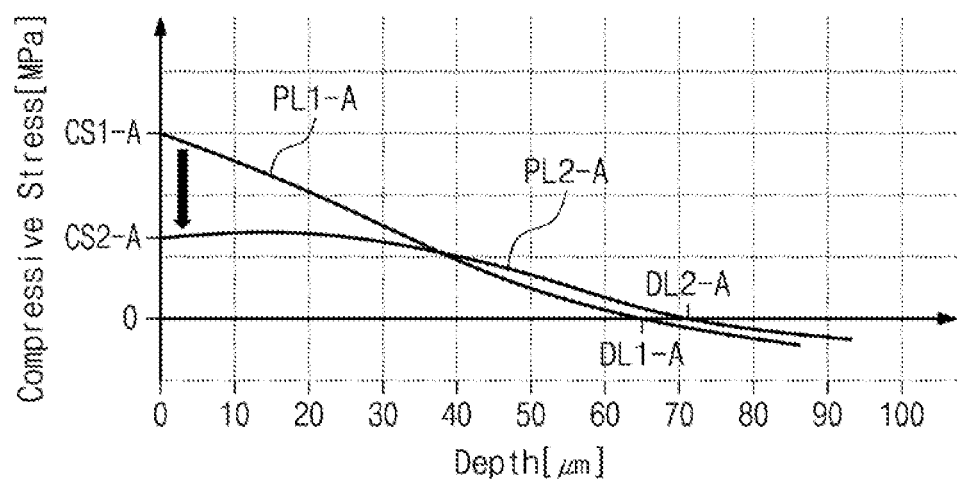
FIGS. 7A and 7B are graphs illustrating a variation of a compressive stress as a function of a depth of a window member according to an exemplary embodiment of the present disclosure.
Figure 7B:
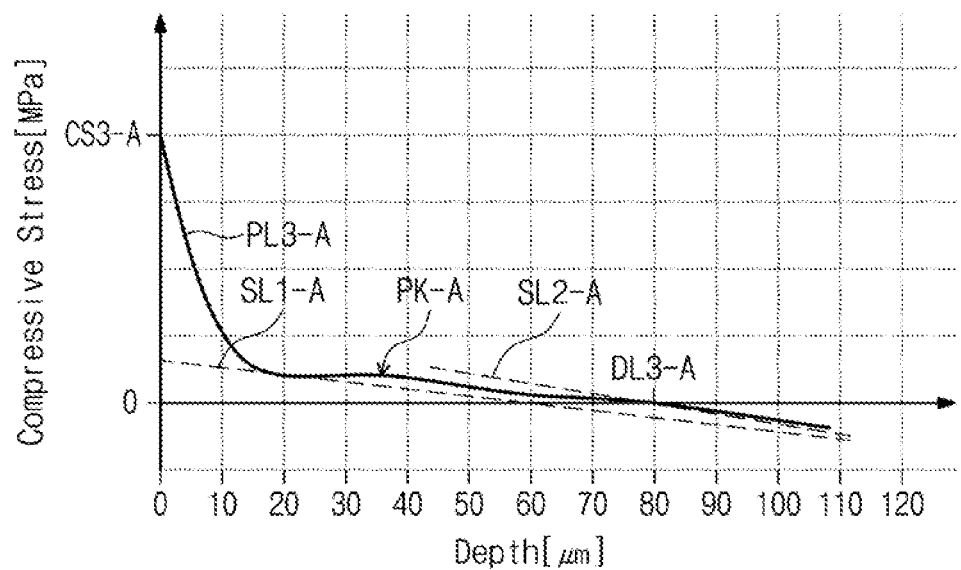

FIGS. 7A and 7B are graphs illustrating a variation of a compressive stress as a function of a depth of a window member according to an exemplary embodiment of the present disclosure. FIGS. 7A and 7B show the variation of the compressive stress as a function of the depth of each result formed by each operation of the manufacturing method of the window member according to an exemplary embodiment of the present disclosure.

For the convenience of explanation, FIG. 7A shows a first graph PL1-A representing a variation in compressive stress as a function of a depth of the first window member 100-S1 (refer to FIG. 5C) and a second graph PL2-A representing a variation in compressive stress as a function of a depth of the second window member 100-S2 (refer to FIG. 5E), and FIG. 7B shows a third graph PL3-A representing a variation in compressive stress as a function of a depth of the window member 100 (refer to FIG. 5G). Hereinafter, the window member 100 according to the exemplary embodiment of the present disclosure will be described in detail with reference to FIGS. 7A and 7B.

Referring to FIG. 7A, the first graph PL1-A shows a distribution of the compressive stress of the first window member 100-S1 formed through the first reinforcement operation S100 (refer to FIG. 4). For example, the first reinforcement operation S100 is performed by exposing the initial window member 100-I (refer to FIG. 5A) to a mixed salt, which is obtained by mixing the sodium nitrate ($NaNO_3$) with the potassium nitrate ($KNO_3$) in 3:7 ratio, at a temperature of about 530° C. during about four hours. Accordingly, referring to the first graph PL1-A, the first window member 100-S1 may have a first surface compressive stress CS1-A and a first depth of compression DL1-A.

As shown in FIG. 7A, the second graph PL2-A shows a distribution of the compressive stress of the second window member 100-S2 formed through the stress relief operation S200 (refer to FIG. 4). For example, the stress relief operation S200 is performed by heat-treating the first window member 100-S1 at a temperature of about 530° C. during about 120 minutes.

Accordingly, referring to the second graph PL2-A, the second window member 100-S2 may have a second surface compressive stress CS2-A and a second depth of compression DL2-A. In this case, the second surface compressive stress CS2-A is measured at about 200 MPa or below.

Referring to the first graph PL1-A and the second graph PL2-A, the first surface compressive stress CS1-A decreases to the second surface compressive stress CS2-A through the stress relief operation $200. The stress relief operation S200 relieves the surface compressive stress of the corresponding member.

The second surface compressive stress CS2-A according to the exemplary embodiment of the present disclosure may be smaller than about 150 Mpa. According to the manufacturing method of the window member, the compressive stress occurring on the surface is relieved through the stress relief operation S200, and thus a surface residual stress formed through the first reinforcement operation S100 may be distributed.

In addition, referring to the first graph PL1-A and the second graph PL2-A, the first depth of compression DL1-A increases to the second depth of compression DL2-A through the stress relief operation S200. The stress relief operation S200 may increase the depth of compression of the corresponding member.

According to the manufacturing method of the window member, the ions generating the compressive stress move to be adjacent to the center portion through the stress relief operation S200, and thus the depth of compression may be controlled to be increased. The depth of compression may correspond to a depth of the compressive stress layer.

As shown in FIG. 7B, a third graph PL3-A shows a distribution of the compressive stress of the window member 100 formed through the second reinforcement operation S300 (refer to FIG. 4). For example, the second reinforcement operation S300 is performed by exposing the second window member 100-S2 to a single salt of the potassium nitrate ($KNO_3$) at a temperature of about 420° C. during about thirty minutes. Accordingly, referring to the third graph PL3-A, the window member 100 may have a third surface compressive stress CS3-A and a third depth of compression DL3-A.

Referring to the second graph PL2-A and the third graph PL3-A, the second surface compressive stress CS2-A increases to the third surface compressive stress CS3-A through the second reinforcement operation S300. The second reinforcement operation S300 provides the potassium ions that provide the surface compressive stress of the window member 100.

In this case, the third surface compressive stress CS3-A is measured at about 800 MPa. The third surface compressive stress CS3-A has a value greater than the first surface compressive stress CS1-A measured at about 300 MPa.

According to the manufacturing method of the window member, since the second reinforcement operation S300 is performed after the stress relief operation S200, the window member may have more ability to accommodate surface compressive stress than when only the first reinforcement operation S100 is performed. Accordingly, the window member 100 according to the exemplary embodiment of the present disclosure may have increased durability against external impacts and damages.

Referring to FIG. 7B, the third graph PL3-A may be divided into a first section and a second section in a range of depth equal to or smaller than the third depth of compression DL3-A. The first section is a depth section adjacent to the surface, and the variation of the compressive stress according to the depth appears relatively large when compared with the first graph PL1-A after the first reinforcement operation.

The second section is a depth section adjacent to the third depth of compression DL3-A, and the variation of the compressive stress according to the depth appears relatively small when compared with the first graph PL1-A after the first reinforcement operation.

In this case, the third graph PL3-A may include a point at which an absolute value of the slope is smaller than about 2 MPa/μm in the second section. For example, a first slope SL1-A shown in FIG. 7B has a value of about −0.6 MPa/μm. For example, the window member 100 according to the exemplary embodiment of the present disclosure may have a graph of depth of compression-compressive stress, which has the slope smaller than the absolute value of 2 in the range of the third depth of compression DL3-A.

For example, the third graph PL3-A may include a point at which the slope is about 0 MPa/μm in the second section. For example, in the window member 100 according to the exemplary embodiment of the present disclosure, a section in which no variation in the compressive stress exists along a direction to which the depth increases may exist.

This means that a graph including a section in which the compressive stress is changed in a gradual manner in the window member 100 may occur. This result may be caused by the stress relief operation S200 in which the potassium ions providing the compressive stress move to the center portion and the compressive stress moves to the center portion from the surface.

For example, the third graph PL3-A may include a point at which the slope is about 0 MPa/μm in the second section. Accordingly, the third graph PL3-A may have a peak point PK-A that is convex upward. The peak point PK-A may exist in the range of the third depth of compression DL3-A, and the peak point PK-A may be a point that is convex to the direction in which the compressive stress increases.

According to other embodiments, the third graph PL3-A according to the exemplary embodiment of the present disclosure may have various shapes as long as the third graph PL3-A has the point at which the absolute value of the slope in the second section is smaller than about 2 MPa/μm.

In addition, referring to the first graph PL1-A and the second graph PL2-A, the first depth of compression DL1-A increases to the second depth of compression DL2-A through the stress relief operation S200. The stress relief operation S200 may increase the depth of compression of the corresponding member.

As the depth of compression increases, a surface hardness of the window member 100 may be increased. Accordingly, an elasticity of the window member 100 may be increased against external impacts, and a crack occurring on an outer portion of the window member 100 may be prevented from being propagated.

The manufacturing method of the window member 100 according to the exemplary embodiment of the present disclosure further includes the stress relief operation, and thus the slope of the variation of the compressive stress according to the depth in the second reinforcement operation may be finely controlled. Accordingly, although the depth of compression is high, the central tension may be prevented from increasing by reducing the slope of the variation in compressive stress according to the depth.

The increase of the central tension accelerates scattering of the window member due to external impacts. According to the present disclosure, the scattering of the window member may be prevented from increasing even though the external impacts are applied to the window member. According to the exemplary embodiment, the window member having the thin thickness may be reinforced, and thus the thin-type window member may have increased durability.

Figure 8A:
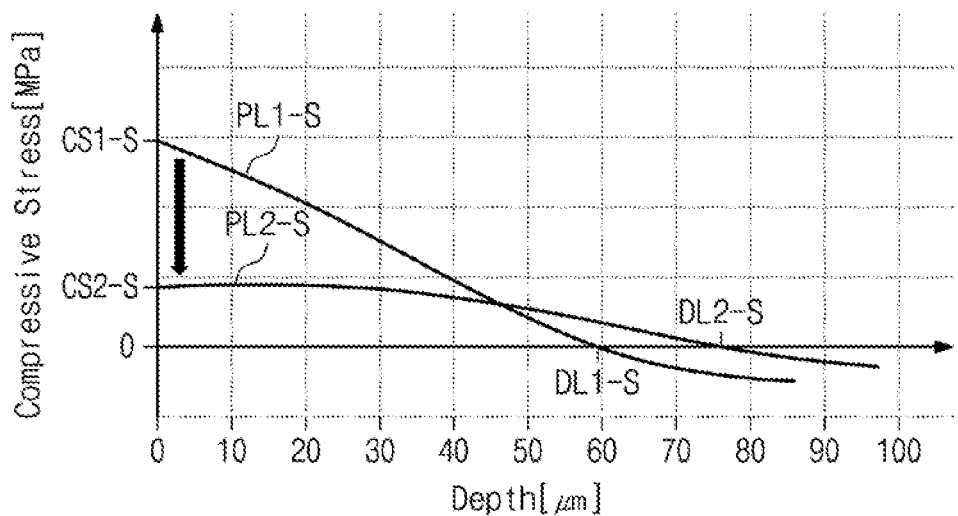
FIGS. 8A and 8B are graphs illustrating a variation of a compressive stress as a function of a depth of a window member according to an exemplary embodiment of the present disclosure.
Figure 8B:
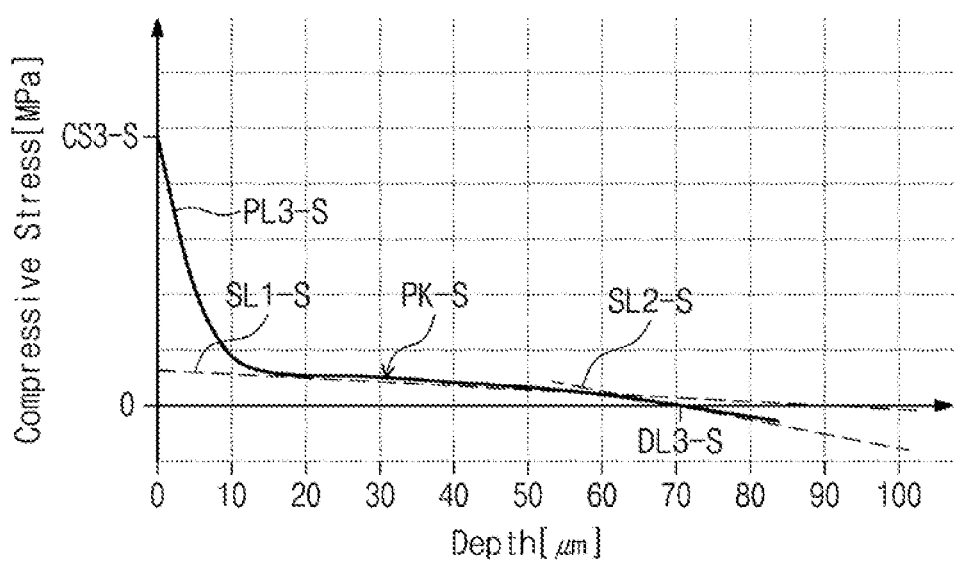

FIGS. 8A and 8B are graphs illustrating a variation of a compressive stress as a function of a depth of a window member according to an exemplary embodiment of the present disclosure. FIGS. 8A and 8B show the variation of the compressive stress as a function of the depth of each result formed by each operation of the manufacturing method of the window member according to the exemplary embodiment of the present disclosure.

For the convenience of explanation, FIG. 8A shows a first graph PL1-S representing a variation in compressive stress as a function of a depth of the first window member 100-S1 (refer to FIG. 5C) and a second graph PL2-S representing a variation in compressive stress as a function of a depth of the second window member 100-S2 (refer to FIG. 5E), and FIG. 8B shows a third graph PL3-S representing a variation in compressive stress as a function of a depth of the window member 100 (refer to FIG. 5G).

FIGS. 8A and 8B show graphs related to the second window member 100-S2 formed by proceeding the stress relief operation S200 (refer to FIG. 4) with a salt treatment. Hereinafter, the window member 100 according to the exemplary embodiment of the present disclosure will be described in detail with reference to FIGS. 8A and 8B. In following description, to the extent that description is omitted, it may be assumed that the omitted description is at least similar to that of the corresponding elements already discussed with respect to FIGS. 7A and 7B.

For example, the stress relief operation S200 may include an operation that heat-treats the first window member 100-S1 (refer to FIG. 5C) by exposing the first window member 100-S1 to the molten salt. The molten salt may include a mixed salt. For example, the molten salt may be a salt obtained by mixing the sodium nitrate ($NaNO_3$) with the potassium nitrate ($KNO_3$). In this case, the mixed salt may be obtained by mixing the sodium nitrate ($NaNO_3$) with the potassium nitrate ($KNO_3$) in a ratio different from that in the first reinforcement operation S100 (refer to FIG. 4).

As shown in FIG. 8A, the graph PL1-S of the first window member to which the first reinforcement operation is applied is changed to the graph PL2-S of the second window member through the stress relief operation S200. In this case, the surface compressive stress may decrease to a second surface compressive stress CS2-S from the first surface compressive stress CS1-S, and the depth of compression may increase to a second depth of compression DL2-S from a first depth of compression DL1-S.

As shown in FIG. 8B, the graph PL3-S of the window member to which the second reinforcement operation is applied is changed to have a third surface compressive stress CS3-S from the second surface compressive stress CS2-S. The third surface compressive stress CS3-S may be greater than the second surface compressive stress CS2-S.

The graph PL3-S of the window member to which the second reinforcement operation is applied has a third depth of compression DL3-S. The third depth of compression DL3-S may be higher than the first depth of compression DL1-S.

In this case, the graph PL3-S of the window member to which the second reinforcement operation is applied may be divided into a first section in which the graph PL3-S has a slope value generally greater than that of the graph PL1-S of the first window member 100-S1 to which the first reinforcement operation is applied and a second section in which the graph PL3-S has a slope value generally smaller than that of the graph PL1-S of the first window member 100-S1 to which the first reinforcement operation is applied in the range of depth equal to or smaller than the third depth of compression DL3-S. According to the manufacturing method of the window member, since the stress relief operation is additionally performed, the graph in which the compressive stress varies depending on the depth of the window member and the section with a varying slope is included is obtained.

The graph PL3-S of the window member to which the second reinforcement operation is applied may include a point at which an absolute value of the slope is smaller than about 2 MPa/μm in the second section. For example, an absolute value of a slope of each of a first slope SL1-S and a second slope SL2-S is smaller than about 2 MPa/μm.

The graph PL3-S of the window member to which the second reinforcement operation is applied may include a point at which an absolute value of the slope is equal to or greater than about 0 MPa/μm in the second section. Accordingly, the graph PL3-S of the window member to which the second reinforcement operation is applied may include a straight-line section substantially parallel to a horizontal axis in the second section or a section that is convex upward. For example, a peak point PK-S shown in FIG. 8B appears as the graph PL3-S of the window member to which the second reinforcement operation is applied has a convex shape.

The manufacturing method of the window member according to the exemplary embodiment of the present disclosure further includes the stress relief operation, and thus the graph of the compressive stress according to the depth may be finely controlled. Therefore, although the depth of the compressive stress increases in the window member having the thin thickness, the central tension may be prevented from increasing by relieving the slope, and thus the window member may have the increased durability.

Figure 9A:
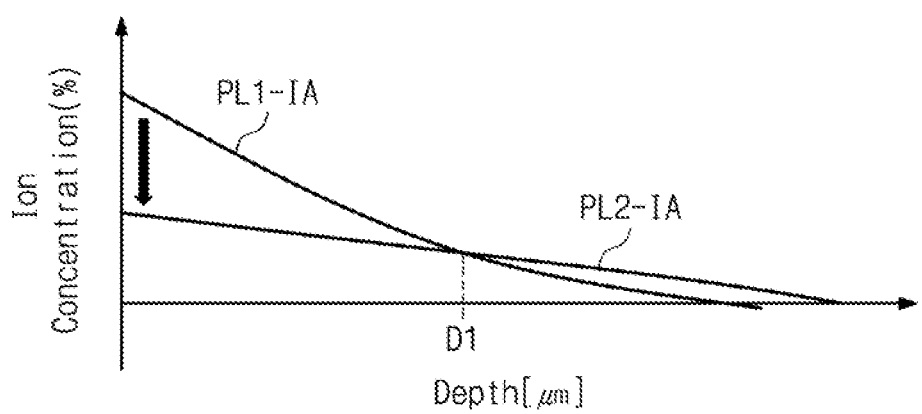
FIGS. 9A and 9B are graphs illustrating a variation of an ion concentration as a function of a depth of a window member according to an exemplary embodiment of the present disclosure.
Figure 9B:
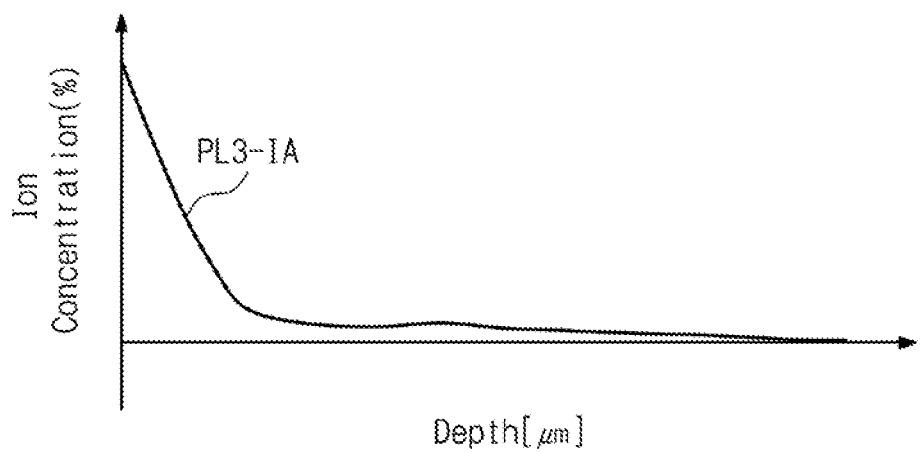

FIGS. 9A and 9B are graphs illustrating a variation of an ion concentration as a function of a depth of a window member according to an exemplary embodiment of the present disclosure. FIGS. 9A and 9B show the variation of the ion concentration as a function of the depth of each result formed by each operation of the manufacturing method of the window member according to the exemplary embodiment of the present disclosure.

The ion concentration variation shown in FIGS. 9A and 9B may be a variation in concentration of the potassium ions ($K^+$). For the convenience of explanation, FIG. 9A shows a first graph PL1-IA representing the ion concentration variation as a function of the depth of the first window member 100-S (refer to FIG. 5C) and a second graph PL2-IA representing the ion concentration variation as a function of the depth of the second window member 100-S2 (refer to FIG. 5E), and FIG. 9B shows a third graph PL3-IA representing the ion concentration variation as a function of the depth of the window member 100 (refer to FIG. 5G).

For example, the second window member 100-S2 may be formed by using the heat treatment as the stress relief operation S200 (refer to FIG. 4). Accordingly, FIGS. 9A and 9B show the ion concentration variation with respect to FIGS. 7A and 7B, respectively.

Hereinafter, the window member 100 according to the exemplary embodiment of the present disclosure will be described in detail with reference to FIGS. 9A and 9B. In following description, to the extent that description is omitted, it may be assumed that the omitted description is at least similar to that of the corresponding elements already discussed with respect to FIGS. 7A, 7B, 8A, and 8B.

Referring to FIG. 9A, the graph PL1-IA of the first window member to which the first reinforcement operation is applied is changed to the graph PL2-IA of the second window member through the stress relief operation S200. In this case, a surface concentration of the potassium ions ($K^+$) appears to be more reduced in the graph PL2-IA of the second window member than that in the graph PL1-IA of the first window member.

As described above, the potassium ions ($K^+$) injected into the first window member 100-S1 move in the stress relief operation S200. The potassium ions ($K^+$) existing adjacent to the surface of the first window member 100-S1 move to the center portion of the first window member 100-S1 through the stress relief operation S200. Accordingly, the ion concentration in the surface is reduced.

Referring to FIG. 9A, the graph PL1-IA of the first window member crosses the graph PL2-IA of the second window member at a depth of a first point D1. The ion concentration of the potassium ions ($K^+$) at the depth equal to or greater than first point D1 is higher in the graph PL2-IA of the second window member than that in the graph PL1-IA of the first window member. This may mean that the potassium ions ($K^+$) move to be adjacent to the center portion of the first window member 100-S1 through the stress relief operation S200.

As shown in FIG. 9B, the graph PL3-IA of the window member to which the second reinforcement operation is applied has the surface ion concentration higher than that of the graph PL2-IA of the second window member. This may be considered as a variation caused by the potassium ions (K$^+$) additionally injected through the second reinforcement operation S300.

Referring to FIG. 9B, when compared to the graph PL1-IA of the first window member, the graph PL3-IA of the window member to which the second reinforcement operation is applied may be divided into a section in which a slope of the concentration variation is relatively large and a section in which the slope of the concentration variation is relatively small. The section in which the slope of the concentration variation is relatively small has the slope close to zero (0).

As described above, the potassium ions (K$^+$) may correspond to a source providing the compressive stress, and the position and concentration variation of the potassium ions (K$^+$) may be related to the distribution of the compressive stress of the corresponding member. The window member according to the exemplary embodiment of the present disclosure further includes the stress relief operation, the concentration distribution of the potassium ions (K$^+$) may be controlled to have a distribution with a steep slope in the section adjacent to the surface and a gentle slope in the section adjacent to the center portion.

Accordingly, although the potassium ions (K$^+$) reach a depth adjacent to the center portion, the central tension may be prevented from increasing, and thus the durability of the window member may be increased.

Figure 10A:
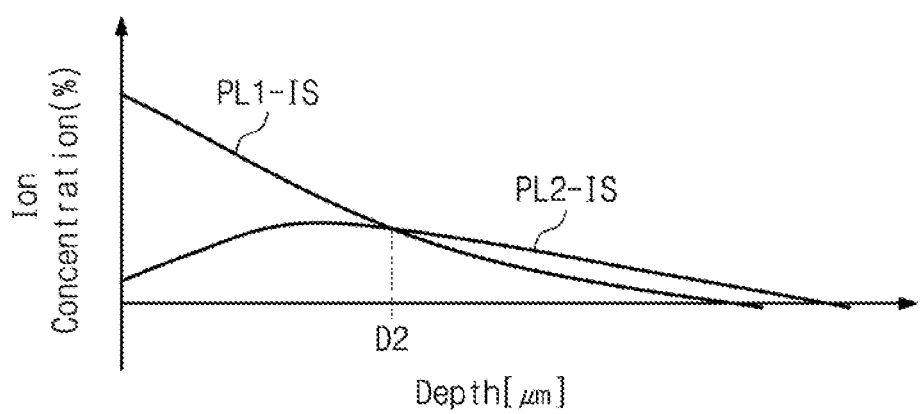
FIGS. 10A and 10B are graphs illustrating a variation of an ion concentration as a function of a depth of a window member according to an exemplary embodiment of the present disclosure.
Figure 10B:
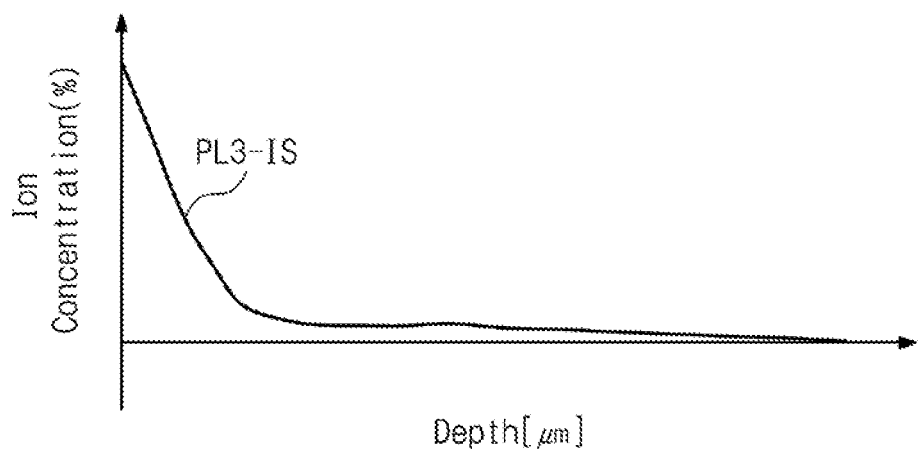

FIGS. 10A and 10B are graphs illustrating a variation of an ion concentration as a function of a depth of a window member according to an exemplary embodiment of the present disclosure. FIGS. 10A and 10B show the variation of the ion concentration as a function of the depth of each result formed by each operation of the manufacturing method of the window member according to the exemplary embodiment of the present disclosure.

The ion concentration variation shown in FIGS. 10A and 10B may be a variation in concentration of the potassium ions (K$^+$). For the convenience of explanation, FIG. 10A shows a first graph PL1-IS representing the ion concentration variation as a function of the depth of the first window member 100-S1 (refer to FIG. 5C) and a second graph PL2-IS representing the ion concentration variation as a function of the depth of the second window member 100-S2 (refer to FIG. 5E), and FIG. 10B shows a third graph PL3-IS representing the ion concentration variation as a function of the depth of the window member 100 (refer to FIG. 5G).

For example, the second window member 100-S2 may be formed by using the salt treatment as the stress relief operation S200 (refer to FIG. 4). Accordingly, FIGS. 10A and 10B show the ion concentration variation with respect to FIGS. 8A and 8B, respectively.

Hereinafter, the window member 100 according to the exemplary embodiment of the present disclosure will be described in detail with reference to FIGS. 10A and 10B. In following description, to the extent that description is omitted, it may be assumed that the omitted description is at least similar to that of the corresponding elements already discussed with respect to FIGS. 9A and 9B.

Referring to FIG. 10A, the graph PL1-IS of the first window member to which the first reinforcement operation is applied is changed to the graph PL2-IS of the second window member through the stress relief operation S200. In this case, a surface concentration of the potassium ions (K$^+$) appears to be reduced more in the graph PL2-IS of the second window member than that in the graph PL1-IS of the first window member.

As described above, the potassium ions (K$^+$) injected into the first window member 100-S1 move in the stress relief operation S200. The potassium ions (K$^+$) existing adjacent to the surface of the first window member 100-S1 move to the center portion of the first window member 100-S1 through the stress relief operation S200. Accordingly, the ion concentration in the surface is reduced.

Referring to FIG. 10A, the graph PL1-IS of the first window member crosses the graph PL2-IS of the second window member at a depth of a second point D2. The ion concentration of the potassium ions (K$^+$) at the depth equal to or greater than second point D2 is higher in the graph PL2-IS of the second window member than that in the graph PL1-IS of the first window member. As described above, this means that the potassium ions (K$^+$) move to be adjacent to the center portion of the first window member 100-S1 through the stress relief operation S200.

Referring to FIGS. 9A and 10A, the surface ion concentration of the graph PL2-IS of the second window member may appear to be lower than the surface ion concentration of the graph PL2-IA of the second window member shown in FIG. 9A, and an upward convex shape may appear before the second point D2.

When the stress relief operation S200 further includes the salt treatment operation, the stress relief operation S200 may exert a larger influence on the movement of the potassium ions (K$^+$) than that when the stress relief operation S200 includes only the heat treatment operation. Accordingly, more rapid variation in ion concentration may be observed in the graph PL2-IA of FIG. 10A, to which the slat treatment is applied, than that in the graph PL2-IA of FIG. 9A.

As shown in FIG. 10B, the graph PL3-IS of the window member to which the second reinforcement operation S300 is applied has the more increased surface ion concentration than that of the graph PL2-IS of the second window member. This may be considered as a variation by the potassium ions (K$^+$) additionally injected into the window member through the second reinforcement operation S300.

Referring to FIG. 10B, when compared to the graph PL1-IS of the first window member, the graph PL3-IS of the window member to which the second reinforcement operation S300 is applied is divided into a section in which a slope of the concentration variation is relatively large and a section in which the slope of the concentration variation is relatively small. Detailed descriptions on the above are as shown in FIGS. 10A and 10B.

The manufacturing method of the window member according to the exemplary embodiment of the present disclosure further includes the stress relief operation that performs the salt treatment with the heat treatment, and thus a mobility of the ions injected into the window member may be increased. Accordingly, the durability of the window member may be increased, and the reinforcement process may be carried out.

Figure 11A:
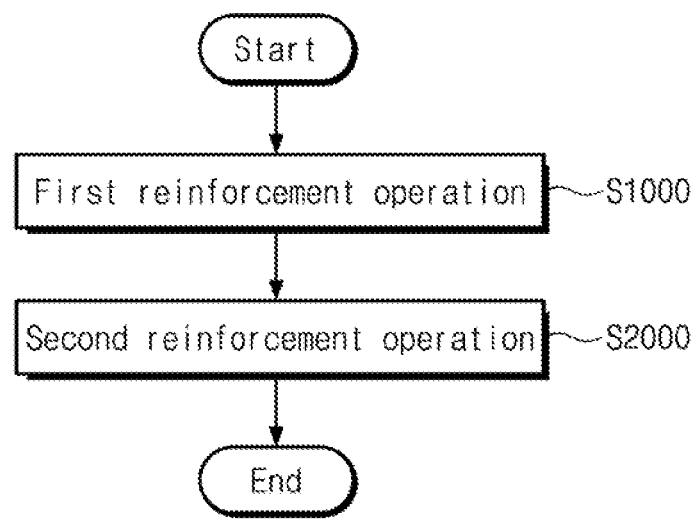
FIG. 11A is a flowchart illustrating a method of manufacturing a window member according to an exemplary embodiment of the present disclosure.
Figure 11B:
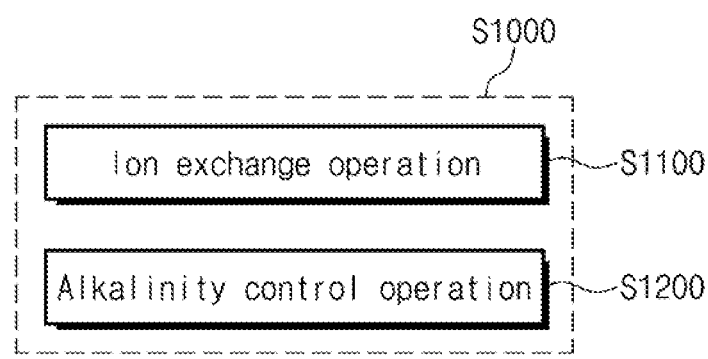
FIG. 11B is a flowchart illustrating a portion of the method of manufacturing the window member of FIG. 11A.

FIG. 11A is a flowchart illustrating a method of manufacturing a window member according to an exemplary embodiment of the present disclosure, and FIG. 11B is a flowchart illustrating a portion of the method of manufacturing the window member of FIG. 11A.

Referring to FIG. 11A, the method of manufacturing the window member according to the exemplary embodiment of the present disclosure may include a first reinforcement operation S1000 and a second reinforcement operation S2000. As shown in FIG. 11A, the stress relief operation S200 shown in FIG. 4 may be omitted from the method of manufacturing the window member. For example, the window member according to the present disclosure may be manufactured through two times reinforcement operation. Hereinafter, the method of manufacturing the window member according to exemplary embodiments of the present disclosure will be described in detail with reference to FIGS. 11A and 11B.

The first reinforcement operation S1000 reinforces an initial window member. Referring to FIGS. 11A and 11B, the first reinforcement operation S1000 may include an ion exchange operation S1100 and an alkalinity control operation S1200.

The ion exchange operation S1100 provides a first reinforcement environment to the initial window member. The first reinforcement environment includes an ion exchange environment that includes a temperature condition at high temperature equal to or higher than about 500° C. and first ion salts.

The ion exchange operation S1100 may substantially correspond to the first reinforcement operation S100 shown in FIG. 4. Accordingly, the first reinforcement environment may include the ion exchange environment that includes the temperature condition with a temperature range of about ±20° C. with respect to a temperature lower than a distortion point of the initial window member by about 50° C. and potassium ion salts. Accordingly, a predetermined compressive stress may occur on a surface of the window member that is first reinforced. To the extent that description is omitted, it may be assumed that the omitted description is at least similar to that of the corresponding elements already discussed.

The alkalinity control operation S1200 controls an alkalinity in the environment of the first reinforcement operation S1000. The alkalinity control operation S1200 may start after the ion exchange operation S1100 starts or may start together with the ion exchange operation S1100.

The alkalinity control operation S1200 may be a step to provide an additive in the first reinforcement operation S1000 to alleviate the alkalinity. Accordingly, the alkalinity control operation S1200 may alleviate the alkalinity of the first reinforcement environment. For example, a concentration of some salts in the first reinforcement environment may increase as the ion exchange operation S1100 proceeds.

For example, the ion exchange environment of the first reinforcement environment may include a liquid solution including a mixed salt. As an example, in the case that the ion exchange environment of the first reinforcement environment includes the mixed salt in the liquid state including a potassium ion salt and a carbonate ion salt, the potassium ion salt infiltrates into the initial window member while the ion exchange operation proceeds, and thus a relative concentration of the carbonate ion salt in the mixed salt may increase. Accordingly, the alkalinity may gradually increase in the first reinforcement environment. In this case, the additive provided in the alkalinity control operation S1200 reacts with the carbonate ion salt remaining in the alkalinity control operation S1200, and thus the alkalinity of the first reinforcement environment may gradually decrease.

The additive may include various materials to alleviate the alkalinity. As an example, the additive may include a chemically stable oxide material, such as an acidic oxide material or an amphoteric oxide material. For example, the additive may include $B_2O_3$, $SiO_2$, $Al_2O_3$, $SnO_2$, or a combination thereof.

For example, the additive may include a silicon nitride-based material. The additive controls the alkalinity of the first reinforcement environment but does not react with the initial window member.

The additive may be provided in small amount in the alkalinity control operation S1200 according to exemplary embodiments of the present disclosure. As an example, the additive may be provided in a ratio equal to or greater than about 0.1% and equal to or smaller than about 1% to the mixed salt in the liquid state of the first reinforcement environment.

As described above, when the alkalinity of the first reinforcement operation S1000 is alleviated, the window member may be more resistant to corrosion. This will be described later.

Referring to FIG. 11A, the second reinforcement operation S2000 may be performed. In this case, the reinforced window member may proceed to the second reinforcement operation S2000 without going through an additional stress relief operation. Accordingly, the manufacturing method of the window member may be simplified, and the manufacturing cost of the window member may be reduced. However, according to some exemplary embodiment of the present disclosure, the stress relief operation may be further performed before entering the second reinforcement operation S2000, and thus reliability of the window member may be increased. However, the manufacturing method of the window member, according to the present invention, is not be limited to the examples described herein.

The second reinforcement operation S2000 may include an ion exchange operation. The second reinforcement operation S2000 may correspond to the second reinforcement operation S300 shown in FIG. 4. The second reinforcement operation S2000 may be substantially the same as previously described with respect to FIG. 4.

The manufacturing method of the window member further includes the alkalinity control operation, and thus the window member having increased reliability may be manufactured.

Figure 12:
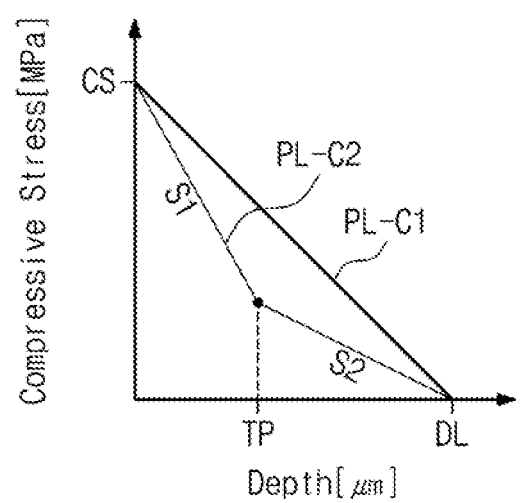
FIG. 12 is a graph illustrating a compressive stress as a function of a depth of a window member according to an exemplary embodiment of the present disclosure.

FIG. 12 is a graph illustrating a compressive stress as a function of a depth of a window member according to an exemplary embodiment of the present disclosure. For the convenience of explanation, FIG. 12 includes the graph illustrating the compressive stress as a function of the depth of the window member that is reinforced through the first reinforcement operation shown in FIG. 11A. In addition, for the convenience of explanation, FIG. 12 shows a first graph PL-C1 and a second graph PL-C2.

The first graph PL-C1 may show the compressive stress as a function of the depth of the window member to which only the ion exchange operation S1100 of the first reinforcement operation S1000 is applied. Accordingly, the first graph PL-C1 may correspond to the compressive stress graph of the first window member 100-S1 shown in FIG. 5C.

The second graph PL-C2 may correspond to the compressive stress graph of the window member to which both the ion exchange operation S1100 and the alkalinity control operation S1200 of the first reinforcement operation S1000 are applied. For example, since the ion exchange operation S1100 is further performed on the window member, according to exemplary embodiments of the present disclosure, in the first reinforcement operation S1000, the window member may have a compressive stress behavior changed to the second graph PL-C2 from the first graph PL-C1.

For the convenience of explanation, FIG. 12 shows schematic graphs having average slopes corresponding to those shown in FIG. 6. Hereinafter, the manufacturing method of the window member according to exemplary embodiments of the present disclosure will be described in detail with reference to FIG. 12.

As shown in FIG. 12, the first graph PL-C1 has a surface compressive stress CS at a point at which a depth is zero (0) and has a compressive stress depth DL when the compressive stress is zero (0). In this case, the average slope of the first graph PL-C1 depending on the increase of the depth from the surface may correspond to the surface compressive stress CS with respect to the compressive stress depth DL.

The second graph PL-C2 has the same surface compressive stress CS and the same compressive stress depth DL as those of the first graph PL-C1, but it should not be limited thereto or thereby. For example, a variation may occur on at least one of the surface compressive stress CS and the compressive stress depth DL since the alkalinity control operation S1200 is performed on the window member, but the present invention is not limited thereto.

The second graph PL-C2 has a transition point TP. The transition point TP may indicate a point at which the slope is abruptly changed. The second graph PL-C2 includes a first plot S1 having a first slope and a second plot S2 having a second slope with respect to the transition point TP.

The first plot S1 shows a compressive stress behavior in a depth range from the surface with a depth of zero (0) to the transition point TP. The first plot S1 is shown in a form of a straight line having the average slope. For example, the first plot S1 may have the average slop equal to or greater than about 200 MPa/μm and equal to or smaller than about −400 MPa/μm.

An absolute value of the average slope of the first plot S1 may be greater than an absolute value of the average slope of the first graph PL-C1. For example, the compressive stress in the depth range equal to or smaller than the transition point TP may be largely reduced compared with the surface compressive stress CS occurring on the surface as the depth increases.

Since the second graph PL-C2 includes the first plot S1, the second graph PL-C2 may have relatively low compressive stress when compared with the first graph PL-C1. According to the present disclosure, the compressive stress in an area adjacent to the surface may be relieved through the alkalinity control operation. Accordingly, the window member may be more resistant to corrosion, which may occur in processing, by controlling the compressive stress in the depth adjacent to the surface during the first reinforcement operation, and thus the reliability of the window member may be increased.

The second plot S2 shows a compressive stress behavior in a depth range equal to or greater than the transition point TP. An absolute value of the average slope of the second plot S2 may be smaller than the absolute value of the average slope of the first graph PL-C1. For example, the second plot S2 may have the average slop equal to or greater than about −8 MPa/μm and equal to or smaller than about −2 MPa/μm.

The compressive stress applied in the depth range equal to or greater than the transition point TP may be slightly reduced compared with the depth range equal to or smaller than the transition point TP as the depth increases.

In this case, according to the present disclosure, since the size of the compressive stress applied to the point having the depth corresponding to the transition point TP is sufficiently lowered, the size of the compressive stress may be low even though the compressive stress is reduced by a small slope in the depth equal to or greater than the transition point TP. Accordingly, the compressive stress occurring in the depth range equal to or greater than the transition point TP may have a relatively small size compared to the first graph PL-C1.

As described above, the compressive stress occurring in the window member that is first reinforced in the range of the compressive stress depth DL from the surface may exert an influence on a central tensile force applied to the window member that is first reinforced in the depth range equal to or greater than the compressive stress depth DL. For example, an area occupied by the second graph PL-C2 is smaller than an area occupied by the first graph PL-C1.

For example, according to the present disclosure, since the manufacturing method of the window member further includes the alkalinity control operation, the transition point TP may be generated, and thus the compressive stress behavior of the window member may be controlled such that the window member has the low central tensile force on the same surface compressive stress CS and the same compressive stress depth DL. Accordingly, the reliability of the window member in process and use may be increased.

Figure 13:
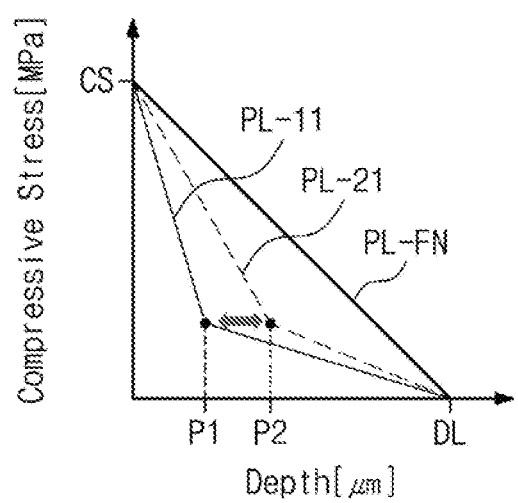
FIG. 13 is a graph illustrating a compressive stress as a function of a depth of a window member according to an exemplary embodiment of the present disclosure.

FIG. 13 is a graph illustrating a compressive stress as a function of a depth of a window member according to an exemplary embodiment of the present disclosure. For the convenience of explanation, FIG. 13 shows a reference graph PL-FN, a first graph PL-11, and a second graph PL-21. In addition, for the convenience of explanation, each of the reference graph PL-FN, the first graph PL-11, and the second graph PL-21 is shown in a straight line with an average slope.

Referring to FIG. 13, the reference graph PL-FN has a predetermined surface compressive stress CS, a predetermined compressive stress depth DL, and a predetermined average slope. The average slope of the reference graph PL-FN may be a ratio of the compressive stress depth DL to the surface compressive stress CS.

The first graph PL-11 may have a first transition point P1. The first graph PL-11 may be divided into two portions distinguished from each other with respect to the first transition point P1 at which the average slope is abruptly changed.

As described above, the first transition point P1 may be formed through the alkalinity control operation S1200 (refer to FIG. 12). The first graph PL-11 may have the average slope having an absolute value greater than an absolute value of the average slope of the reference graph PL-FN in a depth equal to or smaller than the first transition point P1 and have the average slope having the absolute value smaller than the absolute value of the average slope of the reference graph PL-FN in a depth equal to or greater than the first transition point P1.

The second graph PL-21 may have a second transition point P2. The second graph PL-21 may be divided into two portions distinguished from each other with respect to the second transition point P2 at which the average slope is abruptly changed.

As described above, the second transition point P2 may be formed through the alkalinity control operation S1200. The second graph PL-21 may have the average slope having an absolute value greater than the absolute value of the average slope of the reference graph PL-FN in a depth equal to or smaller than the second transition point P2 and have the average slope having the absolute value smaller than the absolute value of the average slope of the reference graph PL-FN in a depth equal to or greater than the second transition point P2.

As shown in FIG. 13, the window member, according to exemplary embodiments of the present disclosure, may be controlled such that the transition point is formed at various depths. According to the present disclosure, the central tensile force of the window member may be controlled by forming the transition point and controlling a position of the transition point while maintaining the surface compressive stress CS and the compressive stress depth DL.

In a case that the transition point of the window member moves to the second transition point P2 from the first transition point P1, the central tensile force of the window member may increase. However, the variation of the compressive stress may be steadily changed to the transition point.

In a case that the transition point of the window member moves to the first transition point P1 from the second transition point P2, the central tensile force of the window member may decrease. Accordingly, the window member may have high impact resistance.

The transition point of the window member, according to exemplary embodiments of the present disclosure, may be greater than about 15 μm. Accordingly, although the window member has high surface compressive stress, the corrosion of the window member occurring during processes or due to an external contamination or impact in use may be prevented.

When the transition point of the window member, according to exemplary embodiments of the present disclosure, increases, the transition point exerts an influence on the central tensile force of the window member. Accordingly, the transition point may be determined within a range where the central tensile force is not too large. As an example, in a window member having a thickness of about 0.8 mm and a limit central tensile stress of about 67 MPa, the transition point may be equal to or smaller than about 30 μm. In the manufacturing method of the window member, according to exemplary embodiments of the present disclosure, the transition point is formed within a range that increases a corrosion resistance with respect to the processes and has the stable central tensile stress, and thus the reliability of the window member may be increased.

Figure 14A:
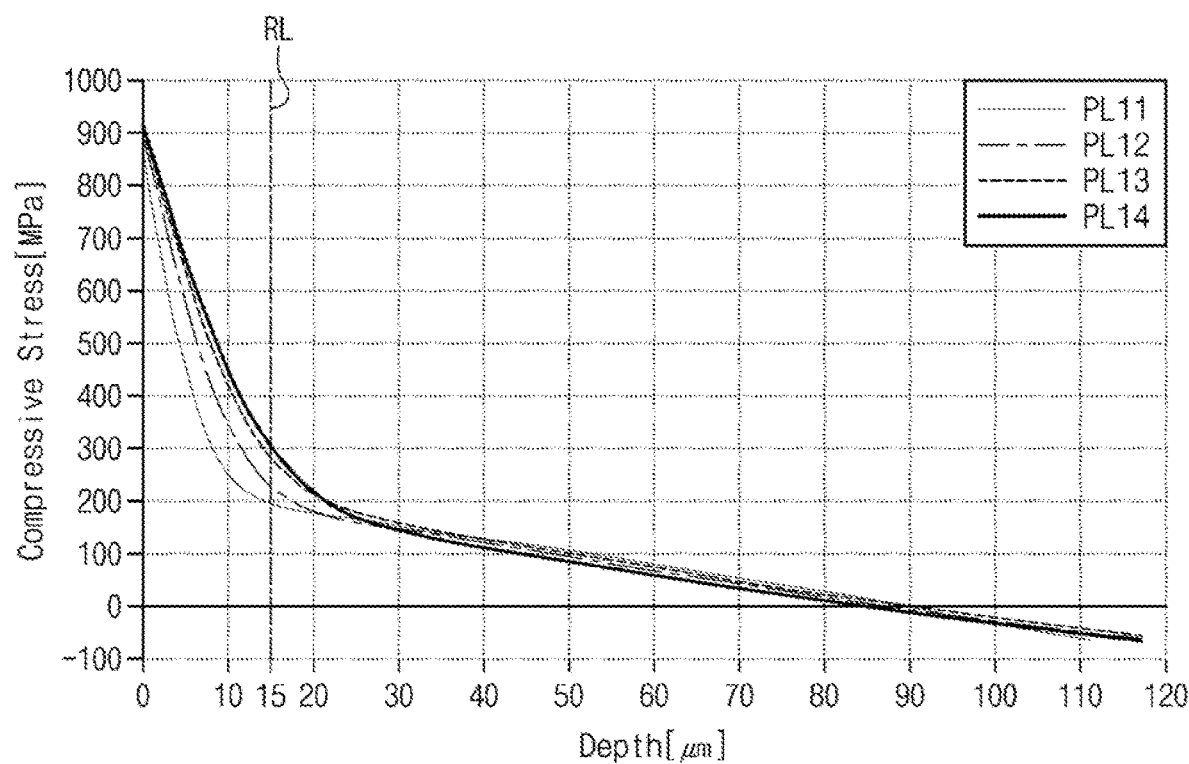
FIGS. 14A and 14B are graphs illustrating a compressive stress as a function of a depth of a window member according to an exemplary embodiment of the present disclosure.
Figure 14B:
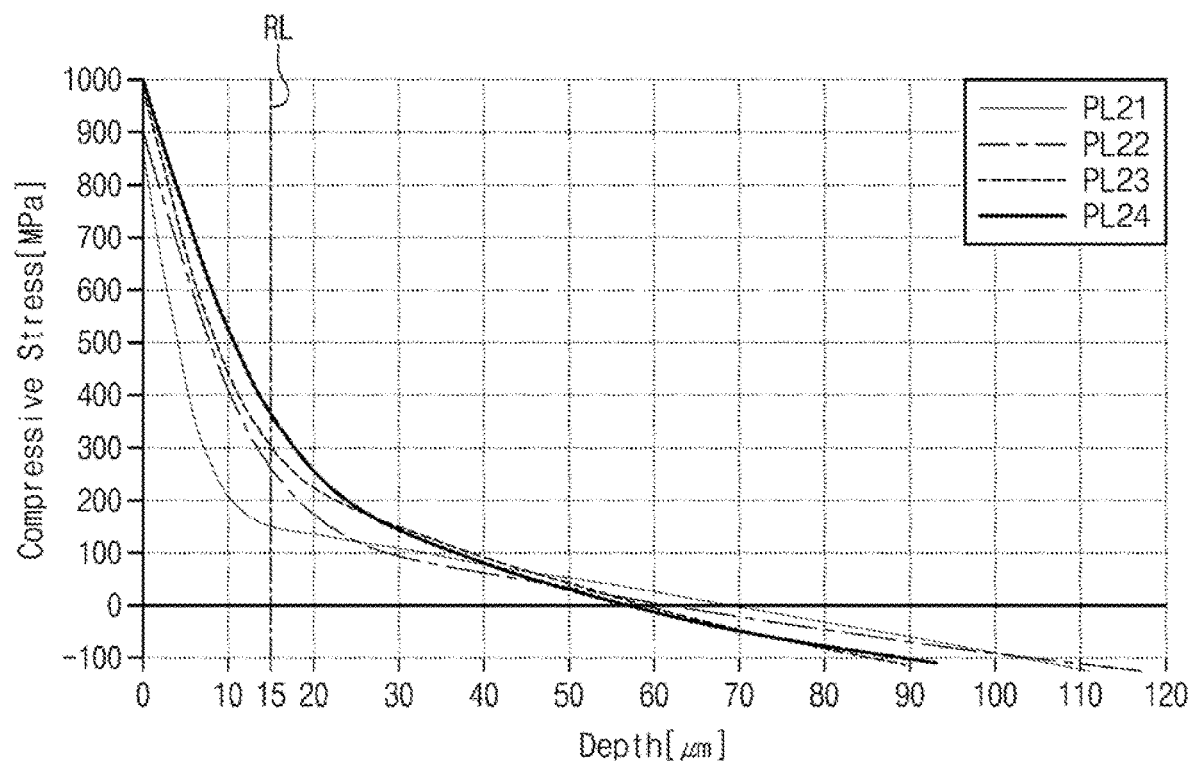

FIGS. 14A and 14B are graphs illustrating a compressive stress as a function of a depth of a window member according to an exemplary embodiment of the present disclosure. FIGS. 14A and 14B show a reference line RL crossing a point at which a depth is about 15 μm. Hereinafter, exemplary embodiments of the present disclosure will be described with reference to FIGS. 14A and 14B.

For the convenience of explanation, FIG. 14A shows first, second, third, and fourth graphs PL11, PL12, PL13, and PL14. The first, second, third, and fourth graphs PL11, PL12, PL13, and PL14 may be compressive stress graphs of exemplary embodiments obtained by applying different time conditions in the second reinforcement operation S2000 (refer to FIG. 11A).

For example, the first graph PL11 indicates a first exemplary embodiment in which the second reinforcement operation S2000 is performed during about 30 minutes, the second graph PL12 indicates a second exemplary embodiment in which the second reinforcement operation S2000 is performed during about 60 minutes, the third graph PL13 indicates a third exemplary embodiment in which the second reinforcement operation S2000 is performed during about 90 minutes, and the fourth graph PL14 indicates a fourth exemplary embodiment in which the second reinforcement operation S2000 is performed during about 120 minutes. Other conditions applied to the first to fourth exemplary embodiments may be the same as each other except for the time conditions. Detailed numerical results with respect to each of the first, second, third, and fourth graphs PL11, PL12, PL13, and PL14 are shown in Table 1 below.

TABLE 1

| | Second reinforcement time | First average slope | Second average slope | Transition point |
|---|---|---|---|---|
| First graph (PL11) | 30 minutes | −103 MPa/μm | −1.8 MPa/μm | 9 μm |
| Second graph (PL12) | 60 minutes | −80 MPa/μm | −1.8 MPa/μm | 12 μm |
| Third graph (PL13) | 90 minutes | −68 MPa/μm | −2.2 MPa/μm | 15 μm |
| Fourth graph (PL14) | 120 minutes | −54 MPa/μm | −2.7 MPa/μm | 17 μm |

As shown in Table 1, the first, second, third, and fourth graphs PL11, PL12, PL13, and PL14 may have different transition points TP (refer to FIG. 12) from each other by varying the second reinforcement time. The first average slope, which is the average slope in the depth range equal to or smaller than the transition point TP, may correspond to the average slope of the first plot S1 shown in FIG. 12. The second average slope, which is the average slope in the depth range equal to or greater than the transition point TP, may correspond to the average slope of the second plot S2 shown in FIG. 12.

Referring to Table 1, the fourth graph PL14 corresponding to the fourth exemplary embodiment has the transition point exceeding about 15 μm. For example, referring to FIG. 14A, the transition points of the first, second, and third graphs PL11, PL12, and PL13 with respect to the reference line RL exist at depths equal to or smaller than the reference line RL. Accordingly, the window member according to the fourth exemplary embodiment may have the corrosion resistance that is higher than those of the first to third exemplary embodiments, and the window member may be less vulnerable during processing.

According to the present disclosure, since a process time (duration) of the second reinforcement operation with respect to the same process condition is controlled, the transition point may be controlled. Accordingly, the reliability of the window member may be increased by controlling a process time of a conventional process without adding separate processes.

For the convenience of explanation, FIG. 14B shows fifth, sixth, seventh, and eighth graphs PL21, PL22, PL23, and PL24. The fifth, sixth, seventh, and eighth graphs PL21, PL22, PL23, and PL24 may be compressive stress graphs of exemplary embodiments obtained by applying different time conditions in the second reinforcement operation S2000 or compressive stress graphs of exemplary embodiments to which the stress relief operation S2000 shown in FIG. 4 is applied.

For example, the fifth graph PL21 and the sixth graph PL22 may be graphs illustrating the compressive stress behavior of the embodiments manufactured by the manufacturing method to which the stress relief operation is added, and the seventh graph PL23 and the eighth graph PL24 may be graphs illustrating the compressive stress behavior of the embodiments manufactured by the manufacturing method to which the stress relief operation is not added.

The fifth graph PL21 relates to a fifth exemplary embodiment in which the second reinforcement operation S2000 is performed during about 30 minutes after the stress relief operation S200, the sixth graph PL22 relates to a sixth exemplary embodiment in which the second reinforcement operation S2000 is performed during about 120 minutes after the stress relief operation S200, the seventh graph PL23 relates to a seventh exemplary embodiment in which the second reinforcement operation S2000 is performed during about 60 minutes without applying the stress relief operation S200 after the first reinforcement operation S1000, and the eighth graph PL24 relates to an eighth exemplary embodiment in which the second reinforcement operation S2000 is performed during about 90 minutes without applying the stress relief operation S200 after the first reinforcement operation S1000.

For example, referring to FIG. 14B, the transition point of the fifth graph PL21 with respect to the reference line RL exists at a depth equal to or smaller than the reference line RL, and the transition points of the sixth, seventh, and eighth graphs PL22, PL23, and PL24 exist at depths exceeding the reference line RL. Accordingly, the window members according to the sixth to eighth exemplary embodiments may have the corrosion resistance higher than that of the fifth exemplary embodiment, and the window member may be less vulnerable during processing.

According to the present disclosure, the transition point may be controlled by controlling the process time of the second reinforcement operation with respect to the same process condition or the addition of the stress relief operation. As an example, referring to the fifth and sixth graphs PL21 and PL22, although the stress relief operation is further applied to the window member, the position of the transition point may be changed by controlling the process time (duration) of the second reinforcement operation. In addition, referring to the seventh and eighth graphs PL23 and PL24, although the stress relief operation is not further applied to the window member, the position of the transition point may be controlled by controlling the process time (duration) of the second reinforcement operation.

In addition, referring to the sixth, seventh, and eighth graphs PL22, PL23, and PL24, in the case that the stress relief operation is not applied to the window member, the process time (duration) of the second reinforcement operation may be reduced to control the position of the transition point.

According to the exemplary embodiment of the present disclosure, the position of the transition point may be changed by controlling various process conditions of the reinforcement operation, and thus the compressive stress behavior of the window member may be controlled.

Although exemplary embodiments of the present invention have been described herein with reference to the accompanying figures, it is understood that the present invention is not limited to these exemplary embodiments but various changes and modifications can be made within the spirit and scope of the present disclosure.

What is claimed is:

1. A method of manufacturing a window member comprising:
    performing a first reinforcement operation including performing a first ion-exchange treatment on an initial window member, the first ion-exchange treatment comprising exchanging some first ions in the initial window member to second ions different from the first ions at a first temperature which is equal to or greater than about 500° C., wherein remaining first ions in the initial window member that are present after the first ion-exchange treatment are not exchanged as part of the first reinforcement operation;
    performing a stress relief operation including simultaneously performing a heat treatment and a salt treatment on the initial window member to which the first reinforcement operation is performed, the salt treatment including exposing the initial window member to a mixed salt including a salt containing potassium ions and a salt containing sodium ions; and
    performing a second reinforcement operation including performing a second ion-exchange treatment on the initial window member to which the stress relief operation is performed,
    wherein the stress relief operation is performed until the second ions of the initial window member move to be closer to a center depth of the initial window member than at least some of the remaining first ions of the initial window member are,
    wherein the ion concentration of the second ions at a region having a depth within a range from a surface of the initial window member to a particular depth of the initial window member is greater after the performance of the first reinforcement operation than after the stress relief operation is performed, and
    wherein the ion concentration of the second ions at a region having a depth from the particular depth to the center depth of the initial window member is smaller after the first reinforcement operation is performed than after the stress relief operation is performed.

2. The method of claim 1, wherein the first temperature at which the first reinforcement operation is performed is within a range of about ±20° C. with respect to a temperature that is about 50° C. lower than a distortion point of the initial window member.

3. The method of claim 2, wherein the initial window member comprises glass.

4. The method of claim 1, wherein the second ions substitute for the some first ions in the initial window member in a one-to-one correspondence.

5. The method of claim 1, wherein the heat treatment of the stress relief operation is performed at a second temperature equal to or greater than about 500° C.

6. The method of claim 5, wherein the first temperature is substantially the same as the second temperature.

7. The method of claim 1, wherein the salt treatment of the stress relief operation includes applying the mixed salt while it is in a liquid state to the initial window member to which the first reinforcement operation is performed.

8. The method of claim 1, wherein the second reinforcement operation provides a single salt to the initial window member to which the stress relief operation is performed.

9. The method of claim 8, wherein the single salt comprises salt ions that are chemically identical to the second ions.

10. The method of claim 9, wherein the single salt comprises a potassium nitrate.

11. The method of claim 1, wherein the second reinforcement operation provides a mixed salt to the initial window member to which the stress relief operation is performed, and the mixed salt of the second reinforcement operation comprises a potassium nitrate mixed with a sodium nitrate.

12. The method of claim 1, wherein the second reinforcement operation is performed at a temperature lower than the first temperature of the first reinforcement operation.

13. The method of claim 12, wherein the temperature of the second reinforcement operation is equal to or greater than about 380° C. and equal to or smaller than about 460° C.

14. A method of manufacturing a window member, comprising:
    performing a first reinforcement operation including performing a first ion-exchange treatment on an initial window member, the first ion-exchange treatment comprising exchanging some first ions in the initial window member to second ions different from the first ions, thereby giving the initial window member a first surface compressive stress and a first depth of compression, wherein remaining first ions in the initial window member that are present after the first ion-exchange treatment are not exchanged as part of the first reinforcement operation;

performing a stress relief operation including performing a salt treatment on the initial window member to which the first reinforcement operation is performed, thereby moving the second ions of the initial window member to be closer to a center depth of the initial window member than at least some of the remaining first ions of the initial window member are and thereby decreasing the first surface compressive stress to a second surface compressive stress and thereby changing the first depth of compression to a second depth of compression located at a region closer to the center depth of the initial window member than the first depth of compression, the second depth of compression being different from the first depth of compression; and performing a second reinforcement operation including performing a second ion-exchange treatment on the initial window member to which the stress relief operation is performed, thereby increasing the second surface compressive stress to a third surface compressive stress, wherein the second reinforcement operation provides a single salt to the initial window member to which the stress relief operation is perforated, and wherein the initial window member to which the second reinforcement operation is performed has a third depth of compression greater than the first depth of compression, and the second reinforcement operation controls a first variation in compressive stress according to a depth in a section between a surface of the initial window member to which the second reinforcement operation is performed and a first depth value smaller than the third depth of compression to be greater than a second variation in compressive stress according to a depth in a section between a surface of the initial window member to which the first reinforcement operation is performed and the first depth value.

15. The method of claim 14, wherein the second depth of compression is greater than the first depth of compression.

16. The method of claim 15, wherein the first surface compressive stress is smaller than about 150 MPa.

17. The method of claim 14, wherein the first reinforcement operation is performed at a temperature equal to or greater than about 500° C.

18. The method of claim 14, wherein the second reinforcement operation controls a third variation in compressive stress according to a depth in a section between the first depth value of the initial window member to which the second reinforcement operation is performed and the third depth of compression to be smaller than a fourth variation in compressive stress according to a depth in a section between the first depth value of the initial window member to which the first reinforcement operation is performed and the first depth of compression.

19. The method of claim 18, wherein the second reinforcement operation controls a fifth variation in compressive stress according to a depth at a second depth value in a depth section between the first depth value of the initial window member to which the stress relief operation is performed and the third depth of compression to be smaller than about 2 MPa/$\mu$m.

20. A method of manufacturing a window member, comprising:

performing a first reinforcement operation comprising an ion-exchange treatment operation that exposes an initial window member to a first reinforcement environment at a first temperature equal to or greater than about 500° C., the first reinforcement environment comprising a first ion, the performing of the first reinforcement operation resulting in the first ion being present within the initial window member;

performing a second reinforcement operation comprising providing the first-reinforced initial window member to a second reinforcement environment at a second temperature smaller than about 500° C. thereby performing an ion-exchange treatment on the first-reinforced initial window member, the second reinforcement environment comprising a second ion, the performing of the second reinforcement operation resulting in the second ion being present within the initial window member at a concentration that is depth-dependent; and performing a stress relief operation that includes performing a heat treatment and/or a salt treatment on the initial window member to which the first reinforcement operation is performed, wherein the second reinforcement operation is performed after the stress relief operation is performed, wherein the first reinforcement environment further comprises a mixed salt comprising a first salt comprising the first ion and a second salt different from the first salt, the initial window member comprises a third ion different from the first ion, and the first reinforcement operation substitutes the first ion for the third ion, and wherein the first reinforcement operation further comprises an alkalinity control operation alleviating an alkalinity of the first reinforcement environment, the alkalinity control operation including providing a silicon nitride-based material as an additive in the first reinforcement operation, wherein an ion concentration of the second ion at a region having a depth within a range from a surface of the initial window member to a particular depth of the initial window member is greater after the performance of the first reinforcement operation than after the stress relief operation is performed, and wherein the ion concentration of the second ion at a region having a depth from the particular depth to the center depth of the initial window member is smaller after the first reinforcement operation is performed than after the stress relief operation is performed.

21. The method of claim 20, wherein the first temperature of the first reinforcement environment is within a range of about ±20° C. with respect to a temperature that is about 50° C. lower than a distortion point of the initial window member.

22. The method of claim 20, wherein the alkalinity control operation is performed while the ion-exchange treatment operation of the first reinforcement operation is performed.

23. The method of claim 20, wherein the additive is included in the first reinforcement environment at a content of about 1% or less.

24. The method of claim 20, wherein the stress relief operation allows the first ion in the initial window member, to which the first reinforcement operation is applied, to be farther from a surface of the initial winnow member.

25. The method of claim 20, wherein the heat treatment of the stress relief operation is performed at a temperature equal to or greater than about 500° C.

26. The method of claim 25, wherein the heat treatment of the stress relief operation is performed at a same temperature as the first temperature of the first reinforcement operation.

27. The method of claim 25, wherein the salt treatment of the stress relief operation provides a mixed salt in a liquid state to the initial window member to which the first reinforcement operation is performed.

28. The method of claim 27, wherein each of the mixed salt in the first reinforcement operation and the mixed salt in the stress relief operation comprises a sodium nitrate mixed with a potassium nitrate, and a ratio of the potassium nitrate to the sodium nitrate in the mixed salt of the stress relief operation is lower than a ratio of the potassium nitrate to the sodium nitrate in the mixed salt of the first reinforcement operation.

29. The method of claim 20, wherein the second reinforcement operation is performed in a temperature range equal to or greater than about 380° C. and equal to or smaller than about 460° C.

30. The method of claim 20, wherein the second reinforcement operation is performed for about 60 minutes or more.

31. The method of claim 20, wherein the initial window member comprises a sodium aluminosilicate glass.

* * * * *